United States Patent [19]
Mark

[11] Patent Number: 6,014,441
[45] Date of Patent: Jan. 11, 2000

[54] METHOD AND SYSTEM FOR GENERATION OF TONE SIGNALS OVER A TRANSMISSION CHANNEL

[75] Inventor: Andrew R. Mark, New York, N.Y.

[73] Assignee: Smart Tone Authentication, Inc., New York, N.Y.

[21] Appl. No.: 08/978,238

[22] Filed: Nov. 25, 1997

Related U.S. Application Data

[60] Division of application No. 08/606,151, Feb. 23, 1996, Pat. No. 5,907,597, which is a continuation-in-part of application No. 08/286,825, Aug. 5, 1994, Pat. No. 5,583,933.

[51] Int. Cl.[7] .................................................. H04M 1/76
[52] U.S. Cl. .......................... 379/361; 379/283; 379/347; 379/418
[58] Field of Search .................................... 379/361, 386, 379/282, 283, 350, 351, 352, 353, 354, 355, 356, 257, 347, 390, 418; 327/100

[56] References Cited

U.S. PATENT DOCUMENTS

| | | | |
|---|---|---|---|
| 3,637,943 | 1/1972 | Funke | 379/342 |
| 3,706,855 | 12/1972 | Pitroda et al. | 179/18 ES |
| 3,806,874 | 4/1974 | Ehrat | 340/149 R |
| 3,832,639 | 8/1974 | Janssen | 327/115 |
| 3,896,266 | 7/1975 | Waterbury | 179/1 SB |
| 3,976,840 | 8/1976 | Cleveland et al. | 179/2 DP |
| 4,007,355 | 2/1977 | Moreno | 235/61.7 R |
| 4,126,768 | 11/1978 | Grenzow | 179/90 B |
| 4,130,738 | 12/1978 | Sandstedt | 179/90 B |
| 4,142,184 | 2/1979 | Lake | 379/361 |
| 4,201,887 | 5/1980 | Burns | 179/2 DP |
| 4,205,203 | 5/1980 | Mehta et al. | 370/110 |
| 4,223,185 | 9/1980 | Picou | 179/84 VF |
| 4,302,810 | 11/1981 | Bouricius et al. | 364/200 |
| 4,320,387 | 3/1982 | Powell | 340/825.34 |
| 4,342,882 | 8/1982 | Gravenhorst et al. | 179/90 B |
| 4,355,210 | 10/1982 | Soulliard | 179/84 VF |
| 4,399,535 | 8/1983 | Southard | 379/257 |
| 4,451,701 | 5/1984 | Bendig | 179/2 TV |
| 4,471,165 | 9/1984 | DeFino et al. | 179/2 A |
| 4,482,802 | 11/1984 | Aizawa et al. | 235/379 |
| 4,490,579 | 12/1984 | Godoshian | 179/2 EC |
| 4,494,114 | 1/1985 | Kaish | 340/825.31 |
| 4,563,548 | 1/1986 | Misherghi et al. | 179/84 VF |
| 4,570,260 | 2/1986 | Basehore | 370/110.2 |
| 4,571,462 | 2/1986 | Janssen | 179/84 T |
| 4,571,463 | 2/1986 | Shefler | 179/90 B |
| 4,585,904 | 4/1986 | Mincone et al. | 179/7.1 TP |
| 4,585,909 | 4/1986 | Otten et al. | 379/361 |
| 4,614,861 | 9/1986 | Pavlov et al. | 235/380 |
| 4,620,064 | 10/1986 | Kessler et al. | 179/2 C |
| 4,638,481 | 1/1987 | Crane et al. | 371/27 |
| 4,639,554 | 1/1987 | Masuda et al. | 379/361 |
| 4,667,087 | 5/1987 | Quintana | 235/380 |
| 4,677,657 | 6/1987 | Nagata et al. | 379/63 |
| 4,679,233 | 7/1987 | Richardson et al. | 379/433 |
| 4,689,478 | 8/1987 | Hale et al. | 235/380 |
| 4,689,760 | 8/1987 | Lee et al. | 370/110.3 |
| 4,697,072 | 9/1987 | Kawana | 235/380 |
| 4,710,613 | 12/1987 | Shigenaga | 235/380 |
| 4,719,322 | 1/1988 | Guzik et al. | 200/5 A |
| 4,720,860 | 1/1988 | Weiss | 380/23 |
| 4,759,056 | 7/1988 | Akiyama | 379/197 |
| 4,761,807 | 8/1988 | Matthews et al. | 379/89 |
| 4,763,355 | 8/1988 | Cox | 379/355 |
| 4,776,006 | 10/1988 | Comerford et al. | 379/159 |
| 4,797,910 | 1/1989 | Daudelin | 379/67 |
| 4,799,254 | 1/1989 | Dayton et al. | 379/97 |
| 4,815,128 | 3/1989 | Malek | 380/9 |
| 4,817,135 | 3/1989 | Winebaum | 379/355 |
| 4,827,512 | 5/1989 | Hirokawa et al. | 380/23 |
| 4,856,062 | 8/1989 | Weiss | 380/23 |
| 4,862,492 | 8/1989 | Zwick | 379/32 |
| 4,866,756 | 9/1989 | Crane et al. | 379/88 |
| 4,866,773 | 9/1989 | Lubarsky | 380/48 |
| 4,868,852 | 9/1989 | Tsumura | 375/59 |
| 4,879,743 | 11/1989 | Burke et al. | 379/142 |
| 4,882,750 | 11/1989 | Henderson et al. | 379/355 |
| 4,885,778 | 12/1989 | Weiss | 380/48 |
| 4,910,767 | 3/1990 | Brugliera et al. | 379/355 |
| 4,922,527 | 5/1990 | Nonami | 379/361 |
| 4,930,129 | 5/1990 | Takahira | 371/40.4 |
| 4,930,160 | 5/1990 | Vogel | 380/23 |
| 4,935,608 | 6/1990 | Tanaka | 235/380 |
| 4,935,961 | 6/1990 | Gargiulo et al. | 380/21 |
| 4,939,470 | 7/1990 | Kang | 328/14 |
| 4,941,172 | 7/1990 | Winebaum et al. | 379/355 |
| 4,972,469 | 11/1990 | Saltwick et al. | 380/2 |
| 4,972,479 | 11/1990 | Tobias, Jr. et. al. | 380/33 |

| | | | |
|---|---|---|---|
| 4,980,910 | 12/1990 | Oba et al. | 379/355 |
| 4,995,077 | 2/1991 | Malinowski | 379/355 |
| 4,998,279 | 3/1991 | Weiss | 380/23 |
| 5,022,080 | 6/1991 | Durst et al. | 380/23 |
| 5,023,908 | 6/1991 | Weiss | 380/23 |
| 5,027,389 | 6/1991 | Chiue et al. | 379/361 |
| 5,027,401 | 6/1991 | Soltesz | 380/54 |
| 5,036,461 | 7/1991 | Elliott et al. | 364/408 |
| 5,050,207 | 9/1991 | Hitchcock | 379/96 |
| 5,054,051 | 10/1991 | Hoff | 379/56 |
| 5,056,141 | 10/1991 | Dyke | 380/25 |
| 5,058,150 | 10/1991 | Kang | 379/58 |
| 5,060,255 | 10/1991 | Brown | 379/67 |
| 5,063,590 | 11/1991 | Koshiishi | 379/99 |
| 5,068,894 | 11/1991 | Hoppe | 380/23 |
| 5,070,233 | 12/1991 | Takizawa et al. | 235/380 |
| 5,073,941 | 12/1991 | Locke | 381/47 |
| 5,120,939 | 6/1992 | Claus et al. | 235/382 |
| 5,125,078 | 6/1992 | Matsuda et al. | 395/275 |
| 5,131,038 | 7/1992 | Puhl et al. | 380/23 |
| 5,168,519 | 12/1992 | Scarinci et al. | 380/6 |
| 5,168,520 | 12/1992 | Weiss | 380/23 |
| 5,170,046 | 12/1992 | Kusakabe | 235/492 |
| 5,177,781 | 1/1993 | Ponton et al. | 379/339 |
| 5,177,785 | 1/1993 | Itani et al. | 380/6 |
| 5,181,238 | 1/1993 | Medamana et al. | 379/95 |
| 5,181,744 | 1/1993 | Betheil | 283/56 |
| 5,182,767 | 1/1993 | Bernard | 379/355 |
| 5,193,114 | 3/1993 | Moseley | 380/23 |
| 5,199,061 | 3/1993 | Kim | 379/53 |
| 5,199,062 | 3/1993 | Von Meister et al. | 379/67 |
| 5,199,081 | 3/1993 | Saito et al. | 382/2 |
| 5,208,446 | 5/1993 | Martinez | 235/380 |
| 5,212,373 | 5/1993 | Fujioka et al. | 235/492 |
| 5,220,158 | 6/1993 | Takahira et al. | 235/492 |
| 5,223,699 | 6/1993 | Flynn et al. | 235/380 |
| 5,227,612 | 7/1993 | Le Roux | 235/379 |
| 5,227,613 | 7/1993 | Takagi et al. | 235/380 |
| 5,239,166 | 8/1993 | Graves | 235/492 |
| 5,239,583 | 8/1993 | Parrillo | 380/23 |
| 5,241,590 | 8/1993 | Deakins et al. | 379/355 |
| 5,243,175 | 9/1993 | Kato | 235/435 |
| 5,245,652 | 9/1993 | Larson et al. | 379/98 |
| 5,247,578 | 9/1993 | Pailles et al. | 380/24 |
| 5,251,259 | 10/1993 | Mosley | 380/23 |
| 5,257,309 | 10/1993 | Brandman et al. | 379/283 |
| 5,276,735 | 1/1994 | Boebert et al. | 380/21 |
| 5,297,194 | 3/1994 | Hunt et al. | 379/88 |
| 5,329,578 | 7/1994 | Brennan et al. | 379/67 |
| 5,343,519 | 8/1994 | Feldman | 379/355 |
| 5,353,342 | 10/1994 | Pietrowicz | 379/361 |
| 5,357,566 | 10/1994 | Dowling, Jr. et al. | 379/355 |
| 5,363,443 | 11/1994 | Petty | 379/418 |
| 5,365,574 | 11/1994 | Hunt et al. | 379/88 |
| 5,369,685 | 11/1994 | Kero | 379/67 |
| 5,369,689 | 11/1994 | Kawamura | 379/100 |
| 5,377,263 | 12/1994 | Bazemore et al. | 379/355 |
| 5,392,342 | 2/1995 | Rosenthal | 379/211 |
| 5,392,447 | 2/1995 | Schlack et al. | 395/800 |
| 5,406,619 | 4/1995 | Akhteruzzaman et al. | 379/95 |
| 5,406,621 | 4/1995 | Binal | 379/386 |
| 5,408,582 | 4/1995 | Colier | 395/2.52 |
| 5,414,755 | 5/1995 | Bahler et al. | 379/67 |
| 5,420,914 | 5/1995 | Blumhardt | 379/114 |
| 5,422,945 | 6/1995 | Wyatt | 379/386 |
| 5,425,084 | 6/1995 | Brinskele | 379/112 |
| 5,425,085 | 6/1995 | Weinberger et al. | 379/112 |
| 5,428,678 | 6/1995 | Fitzpatrick et al. | 379/201 |
| 5,430,827 | 7/1995 | Rissanen | 395/2.82 |
| 5,440,627 | 8/1995 | Puri | 379/355 |
| 5,452,352 | 9/1995 | Talton | 379/355 |
| 5,454,035 | 9/1995 | Oba et al. | 379/354 |
| 5,465,290 | 11/1995 | Hampton et al. | 379/67 |
| 5,469,499 | 11/1995 | Lanning | 379/196 |
| 5,485,370 | 1/1996 | Moss et al. | 364/408 |
| 5,499,288 | 3/1996 | Hunt et al. | 379/88 |
| 5,506,885 | 4/1996 | Hamilton | 379/257 |
| 5,510,777 | 4/1996 | Pilc et al. | 340/825.31 |
| 5,530,743 | 6/1996 | Sakurai | 379/257 |
| 5,537,102 | 7/1996 | Pinnow | 340/825.3 |
| 5,550,575 | 8/1996 | West et al. | 348/5.5 |
| 5,588,053 | 12/1996 | Xie | 379/282 |
| 5,608,784 | 3/1997 | Miller | 379/88 |
| 5,619,564 | 4/1997 | Canniff et al. | 379/386 |
| 5,623,539 | 4/1997 | Bassenyemuskasa et al. | 379/88 |
| 5,781,626 | 7/1998 | Koue | 379/418 |

FOREIGN PATENT DOCUMENTS

| | | | |
|---|---|---|---|
| 5-308302 | 11/1993 | Japan | 379/447 |
| WO 88/03294 | 5/1988 | WIPO . | |

OTHER PUBLICATIONS

Fitzgerald, Karen, "The quest for intruder–proof computer systems", IEEE Spectrum, vol. 26, No. 8, pp. 22–26, Aug. 1989.

Davis et al., "Wallet Terminal Keyboard with Acoustic Coupler", IBM Technical Disclosure Bulletin, vol. 10, No. 3, pp. 188–189, Aug. 1967.

Marven, Craig, "General purpose tone decoding and DTMF detection", Texas Instruments LTD., Regional Technology Centre, Bedford, England (date unknown).

*Primary Examiner*—Scott Wolinsky
*Attorney, Agent, or Firm*—Testa, Hurwitz & Thibeault, LLP

[57] ABSTRACT

A user-authentication system includes an authorized user device (AUD) for transmission of dtmf tones to a user-verification system (UVS) over a telephone network, where user-verification is performed and authorized users are granted access to a desired service. In a memory module of the AUD, a plurality of passphrases and identifying data are stored for subsequent transmission to the UVS. The compensating system comprises a pair of tone devices that generate low frequency tones and high frequency tones, respective that are amplified to different amplification levels. The amplification levels compensate for the low and high frequency tone transmission characteristics associated with different microphones in use in a public telephone system. The systems further performs channel normalization with the user-activated AUD and the UVS. Tone signals representative of the access telephone number transmitted by the AUD to reach the UVS, have a reference amplitude of zero. The UVS receives the tones and a variable amplifier generates gain factors that compensate for deviations in the expected signal strength of each of the tone, caused by deficiencies in the telephone system. In another embodiment, the AUD generates a first plurality of standard tones that are representative of the portion of the frequency spectrum in which an authorized user's voice typically lies. This compensation permits the UVS to have an accurate representation of transmitted signals such as the user's voice, prior to performing user-verification.

14 Claims, 12 Drawing Sheets

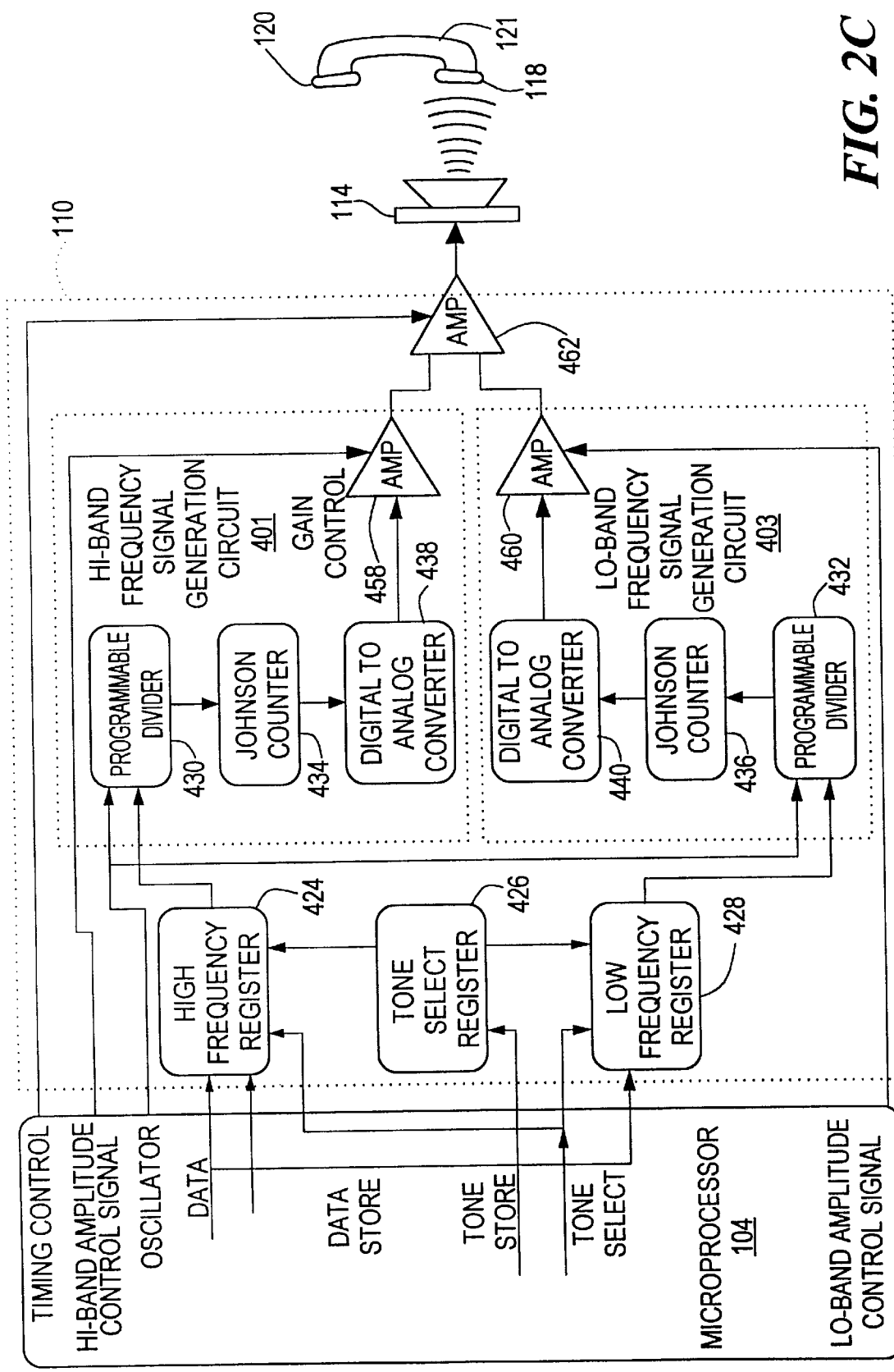

METHOD AND SYSTEM FOR GENERATION OF TONE SIGNALS OVER A TRANSMISSION CHANNEL

CROSS-REFERENCE TO A RELATED APPLICATION

This application is a divisional of U.S. Ser. No. 08/606,151, filed Feb. 23, 1996, and issued as U.S. Pat. No. 5,907,597 on May 25, 1999, which is a continuation in part of Ser. No. 08/286,825, filed Aug. 5, 1994, which issued as U.S. Pat. No. 5,583,933 on Dec. 10, 1996.

FIELD OF THE INVENTION

This invention relates to a user-authentication system, and more particularly to a user-authentication system using voice-related data.

BACKGROUND OF THE INVENTION

Telephone transactions are often used by consumers to obtain extensions of credit, make payment of debts, perform fund transfers, and order products from catalogs. Typically such transactions are carried out by a user with a touch-tone telephone, who enters a telephone number to access a service and enters numbers relating to the service such as credit card numbers or menu selections, from the telephone keypad after obtaining access.

Touch tones are the dual tone multi-frequency signals ("DTMF" tones), generated as the user enters numbers from the keypad. In accordance with the DTMF technique used to generate touch tone signals, a touch tone signal is produced by generating two tones, one tone being selected from a high frequency band group and the other being selected from a low frequency band group. Each of the low frequency tones corresponds to one of the four rows of keys on a standard telephone keypad, while each one of the four high frequency tones corresponds to one of the four columns of keys on a standard extended telephone keypad. A standard telephone keypad typically has three columns, but can be extended, as the tones generated by a fourth column are recognized by most central office receivers. In telephone transactions, the touch tones typically represent a number or character that corresponds to user-information (e.g., entering numbers that represent a credit card number, entering letters that represent a surname) or service selections (e.g., entering a "1" to choose a list of products offered, versus entering a "0" to order products).

Although telephone transactions afford convenience to those who use them, they are often wrought with security problems. For example, a person viewing or overhearing the initiation of a telephone transaction can record a credit card number entered through the telephone keypad or spoken into the handset microphone. The recorded credit card number is later, and often undetectably, used to carry out fraudulent transactions by unauthorized individuals. Similarly, a person overhearing or viewing another entering a personal identification number ('pin') can use the pin to access, and often deplete or use, such accounts as one's bank account or telephone calling card account, with the account holder discovering the theft only after the damage has been done.

While portable electronic information cards have attempted to solve the problem by providing a system that can be acoustically coupled to a telephone system, the data transmission errors and security problems inherent in such cards has inhibited widespread acceptance and use of them. Security problems such as pin detection remain common, particularly when one uses the card with a cellular phone. Moreover, errors associated with such cards are often due to the necessary acoustic couplings associated therewith. Also common are errors due to temperature variations affecting battery voltages, amplification levels applied to DTMF signals, speaker proximity to a telephone handset's microphone, distortions introduced by the microphone receiving DTMF tones, and ambient noise. Although promising a measure of convenience and privacy, the implementation of electronic information cards has brought about a host of new problems without significantly alleviating or solving many existing security problems associated with telephone transactions.

As the accuracy and security associated with telephone transactions is often compromised, there exists a need for a system capable of maintaining the flexibility and convenience inherent in telephone transactions, while not comprising the privacy and security necessary to prevent the occurrence of fraudulent transactions.

The present invention provides a user-authentication system that avoids the above-noted problems, while improving signal transmission, signal routing, and system security.

SUMMARY OF THE INVENTION

In brief summary, the invention relates to an improved user-authentication system that includes a user-activated authorized user device (AUD) and a user-verification system (UVS). In one embodiment, the system includes a user-activated AUD that is portable and easily couplable to a telephone or microphone for transmission of dtmf tones to the user-verification system accessible by the telephone network. In one embodiment, the user-activated AUD has stored therein, voice-related data representing the human voice characteristics of the authorized user, as well as encoded access data enabling the voice-related data to be transmitted to the designated user-verification system. Tones transmitted from the user-activated AUD reach a publicly switched network from which they are passed through an integrated services digital network to a routing system which ensures that the tones reach their intended UVS.

In one embodiment of the invention, the user-authentication system comprises a compensating system associated with the user-activated AUD and designed to compensate for the variances in the transmission channel, including variances associated with handset microphones. The compensating system comprises a pair of tone generator devices that generate low frequency tones and high frequency tones, respectively. In electrical communication with the tone generator devices are amplifiers that amplify each of the low frequency tones and high frequency tones to predetermined, different amplification levels. The amplification levels compensate for the low and high frequency tone transmission characteristics associated with different microphones in use in a public telephone system. The compensating system combines each of the low frequency tones with a respective one of each of the high frequency tones to form at least two tone pairs, each tone pair having a low frequency tone and a high frequency tone, specifically configured to compensate for any deficiencies in the transmission efficiency of the particular microphone used.

In other embodiments of the user-authentication system, the system performs channel normalization with the user-activated AUD and the UVS. The channel is the communication medium over which signals are transmitted between the AUD and the UVS. In one embodiment, tone signals representative of the access telephone number transmitted by the AUD to reach the UVS, have a reference amplitude of zero. The UVS receives the tones and a variable amplifier generates gain factors that compensate for deviations in the expected signal strength of each of the tones, caused by deficiencies in the telephone system. In another embodiment, the AUD generates a first plurality of standard tones that are representative of the portion of the frequency spectrum in which an authorized user's voice typically lies. A transmitter transmits the first plurality of standard tones to the UVS. The UVS receives the first plurality of standard tones and a variable amplifier generates amplification gain factors that compensate for deviations in the expected signal strength of each of the first plurality of standard tones, caused by deficiencies in the telephone system. In yet another embodiment, an inter-digit pause between tone signals transmitting data, is used to transmit single frequencies of predetermined amplitudes. In response to the reception of the single frequencies at the UVS, the variable amplifier generates amplification gain factors. In each of the above embodiments, the UVS then amplifies any further signals using the amplification gain factors derived from the compensation of the tones. This compensation permits the UVS to have an accurate representation of transmitted signals such as the user's voice, prior to performing user-verification.

In yet another embodiment of the invention, the user-authentication system includes a routing system for routing a tone signal from the user-activated AUD to a UVS where user-verification can take place. The user-activatable AUD includes a tone-generator that transmits a plurality of tones comprising an initial alert tone followed by data tones representing information-related data and destination-related data. A central switch on the telephone network comprises a receiver that receives the tones; a processor that analyzes the plurality of tones; and a router which routes the plurality of tones to a UVS in response to the alert tone. More specifically, this aspect of the present invention routes the plurality of tones to another switch on the network when the alert tone is not recognizable, and routes the plurality of tones to a UVS when the alert tone is recognizable.

In still another embodiment of the invention, a UVS includes a system clock to prevent fraudulent access of a system or network by an unauthorized user who transmits a tape recording of the authorized user's voice. The UVS transmits a time signal, relating to the time supplied by the system clock during the time period when a user is supplying information by way of the telephone network. A receiver in electrical communication with an analyzer, receives the user-supplied information and the time signal, if present. The analyzer determines whether the time signal corresponds to approximately the present time. The user is denied access if the signal relating to time corresponds to a time other than the present time at which the user was requested to provide the information.

These and other objects, aspects, features and advantages of the invention will become more apparent from the following drawings, detailed description and claims.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2C is a block diagram illustrating an embodiment of the dtmf encoder components of FIG. 2A and the associated data path taken when the AUD is used for data transmission.

FIGS. 7B-1 and 7B-2 are a flow charts describing the process by which the system performs user-verification.

DETAILED DESCRIPTION OF THE INVENTION

Figure 1:
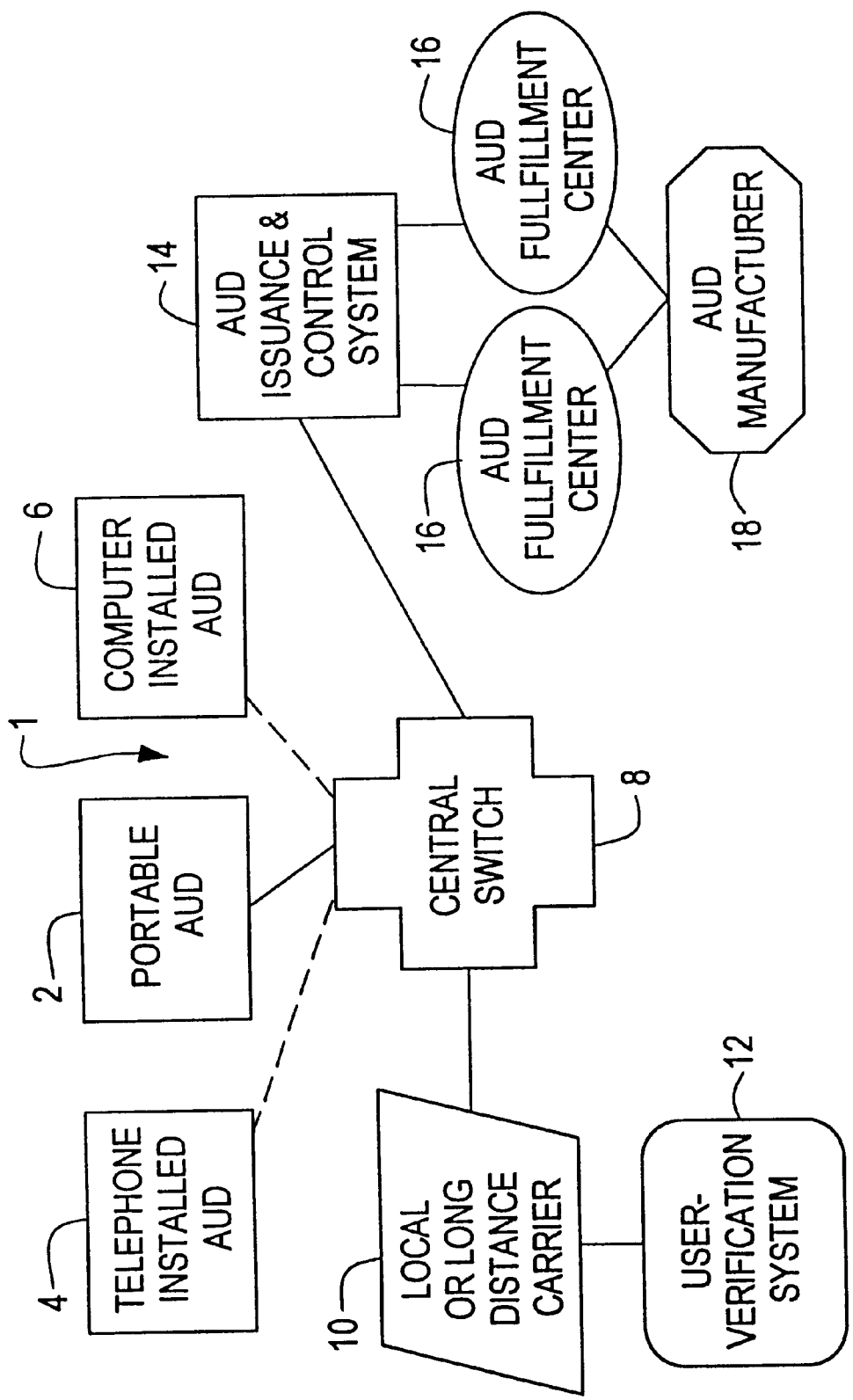
FIG. 1 is a block diagram showing the user-authentication system of the present invention.

Referring generally to FIG. 1, the user-authentication system 1 of the present invention is shown. The user-authentication system 1 includes a user-activated AUD 2 that is preferably portable for use with a landline or cellular telephone. Alternatively, the AUD can be installed in or attached to, a system capable of transmitting tone signals, such as a telephone 4 or computer 6. The AUD 2 is a user-activatable device carrying authorized user-identifying information in volatile memory, as further described below. User-identifying information pertains to data relating to a user's characteristics such as user-chosen identifying numbers or words (examples of which are pin numbers and passwords or passphrases), identifying characteristics or data (examples of which are eye color, social security number, and place of birth), as well as authorized user voice-related data, an example of which is a spectral representation of the user's voice.

As will be further described, the user-activated AUD 2 has a transmitter for transmitting the user-identifying information over a telephone network in the form of low frequency and high frequency tone signals. If used with a landline telephone or computer, the tone signals are initially transmitted to a telephone exchange switch, hereinafter referred to as a central switch 8 capable of routing the signals to a user-verification system (UVS) 12 by accessing the telephone network 10, for example, a local exchange carrier such as NYNEX, and possibly a long distance carrier such as AT&T, as further described below. If used with a cellular telephone, for example if one is calling from a car phone, the tone signals are initially transmitted to a cellular telephone switch (not shown) which transmits the tone signals to the central switch 8 which routes them to the UVS 12 as described above. Upon reaching the UVS 12, as further described herein, a voice prompt will ask the user to transmit user data from his AUD, whereupon the UVS 12 transmits signals intended to frustrate an interloper who is using the AUD as part of a fraudulent attempt to impersonate the actual owner of the AUD.

In one embodiment, there are preferably a plurality of UVS's 12 available to the user on both the local and the long distance telephone network, however the signals are typically only routed to only one of them. Preferably, the UVS 12 that receives the signals is accessible over the local telephone network. The UVS 12 includes electronic processing components, as further discussed below, which are capable of performing tone-signal level correction, voice verification, time stamp verification, knowledge-based verification, and other functions such as pin number verification. The UVS 12, upon determining a valid and authorized user, serves as the user's gateway to accessing services including but not limited to private records, e.g., telephone or banking, mail order companies, the internet and certain chat groups, as well as other information services such as DIALOG, WESTLAW, and various reporter services. The UVS 12, is further equipped with additional security safeguards for detecting unauthorized users, as further described below. The UVS 12, based upon its analysis of the user-spoken data, determines the level of certainty that the currently spoken utterances match those of the user to whom the AUD 2 has been assigned.

The call architecture for transmitting the tones to an intended UVS 12 in the embodiment shown in FIG. 1 is as follows. The user activates the AUD 2 when he/she desires to access a service for which user-authentication is required. If the user is activating the AUD 2 with a cellular telephone, the number dialed by the AUD 2 is first transmitted to a cellular switch (not shown), which may have preliminary authenticating tests associated therewith. If the user is preliminarily-authenticated the call is transmitted to a Far End Local Switching Office (FSO) (not shown). With landline communications, the number dialed by the AUD 2 reaches an FSO located on the network nearest the telephone. The FSO, upon receipt of signals from the AUD 2 decodes the alert tone and destination data to determine which UVS 12 the signals should be routed to. The FSO receives destination data, e.g. a telephone number, for the user's local UVS 12. Often, however the user is located outside of the calling area in which the UVS 12 is located. Thus, after receiving the destination data, the FSO communicates with a network database to determine, based on the telephone number that the user is dialing in from, to determine which local UVS 12 the tone signals should be sent to. The FSO, after receipt of a signal from the database indicating the telephone number associated with a local UVS 12, the FSO will send the tones to an Near End Switching Office (NSO) (not shown) located on the network nearest the local UVS 12. In this manner, the tones will be transmitted from the FSO to an NSO over a local carrier. Upon reaching the NSO, the signals are routed to the central switch 8. The central switch 8 thus decodes an alert tone (602), as further described below, which is indicative of a request to be transferred to a UVS 12, and destination data (610), as further described below, which typically designates the user's local UVS 12. If the alert tone (602) is recognized, the central switch 8 routes the signals back to a UVS nearest the NSO. In the event that the central switch 8 does not recognize the alert tone (602), the signals are routed according to the destination data (610), thus the signal is sent back to the NSO over appropriate carriers via a packet switching system and other central switches to an appropriate UVS 12.

Also shown in this figure is the call architecture of the system when a new AUD 2 is activated. In this scenario, an AUD device manufacturer 18 communicates with an AUD fulfillment center 16 responsible for loading the user's speech file and other identifying data into the AUD 2. The fulfillment center 16 communicates with an AUD device issuance and control system 14 responsible for ensuring that the central switch 8 and appropriate UVS 12 acknowledge the AUD 2 upon initial use by the user. The issuance and control system 14 also communicates with a packet switching system (not shown) which provides the necessary data to the FSOs, NSOs, and central switch 8 on the local network, as well as other central switches located on long distance networks. In this manner any FSO, NSO, or central switch on a local or long distance carrier can process any call request made by any user of an AUD 2.

As stated above, the AUD issuance and control system 14 is responsible for activating new AUDs. AUD fulfillment centers 16 receive "blank" AUD's, i.e. those without any identifying information relating to a user, from an AUD manufacturer 18. Users become subscribers and thus obtain an AUD 2 by calling the AUD issuance and control system 14. The AUD issuance and control system 14 thus receives the name of the subscriber who will be the primary subscriber, to "head" the account. Typically, if a family account is to be issued, the primary will be the mother or father. Notwithstanding the designation of a primary, a spouse will have privileges equal to those of the primary.

The primary, upon contact with the issuance and control system is asked a series of questions, typically requesting the primary's: name, telephone number, social security number, address, age, date of birth, place of birth, mother's maiden name, number of siblings, children's birthdays, number of children, and descriptive characteristics like eye and hair color, as well as height. Responses to the questions are stored as identifying information needed to later identify the user through knowledge-based questioning. Additionally, the user will be asked to select a personal identification number (PIN) and a plurality of passwords or passphrases, for recordation in a speech file which will later be used for user and voice-verification. As the primary states the passwords or passphrases, his/her voice will be recorded by the system 14 in a speech file. If the primary is calling the AUD issuance and control system 14 using a cellular phone, the primary will be requested to state the passwords or passphrases through the telephone handset as well as through the speakerphone, due to the increased ambient noise levels associated with the speakerphone.

The AUD issuance and control system 14 is also responsible for performing password or passphrase sufficiency screening to ensure that that the proposed password or passphrases have the proper characteristics to allow it to be used for a user's typical channel conditions and the level of security desired. The proper characteristics can include, but are not limited to: the proper phonetic makeup, the spectral distribution of the user's voice, and the proper cadence. After the user speaks a password or passphrase, it is evaluated using one or more of these characteristics. If it does not possess desirable levels of one or more of these characteristics, the password or passphrase is rejected and the user is prompted to choose another password or passphrase. Typically a deficiency in one of these characteristics can be compensated for in the other characteristics. Algebraically, each characteristic is assigned a value, which when added to the values assigned to the other characteristics results in a measure of acceptability of the password or passphrase. This is shown as:

$$P+\lambda+C=K$$

where P represents the phonetic makeup, λ represents the spectral distribution, C represents the cadence, and K represents the minimum acceptability value which is a function of the types of channels the user intends to use, and the desired level of security. If the level of acceptability is less than the desirable level required to authenticate the user, the password or passphrase is rejected and the user is prompted to propose another password or passphrase. It should be noted that if one of the characteristics for which the password or passphrase is evaluated is insufficient, one or more of the other values can compensate for it. For example, if the user has a low cadence password or passphrase, but the phonetic makeup is high, then the combination of cadence and phonetic makeup can lead to an acceptable value, making the password or passphrase acceptable to the UVS 12.

Should the primary desire other users to be included on the account, the primary contacts the system 14 and enables the user as a subordinate. Identifying information and speech files are then compiled by the system 14 for such subordinates. Additionally, restrictions on time limits as well as the ability to access certain services through the UVS 12 may be placed upon the subordinate's account by the primary. The AUD fulfillment centers 16, under the direction of the AUD issuance and control system 14 thus installs both primary and subordinate users' personal identifying data, pin, and speech files into an AUD 2. After installing such information, the AUD fulfillment centers 16 transmit the serial numbers of the "identified" AUDs 2 back to the issuance and control system 14, and the AUD 2 is mailed to the primary and subordinate users. Hereinafter, the term user, unless otherwise specified, will mean either the primary or subordinate user.

As shown in Table I below, the AUD 2, in one embodiment of the invention, stores the personal identifying data, pin and speech file in ROM, as further described in FIG. 2A. In Table I, the following headings appear: field, quantity, bytes and extension. The column designated 'Field' designates the items to which the data relates. Data relating to these items is typically installed by the AUD manufacturer 18, AUD fulfillment center 16, or AUD issuance and control system 14, or as an update received after it has been registered to the user, described in further detail below. The column designated 'Quantity' refers to the number of such field items for which data is stored. The column designated 'Bytes' references the number of bytes of memory allocated to the data in each of the fields. The column designated 'Extension' relates to the amount of memory required to store the data. The memory allocations in Table I are exemplary, as other allocations may be used by those of ordinary skill without departing from the scope of the invention.

In this embodiment, the AUD 2 is assigned a device number and a body number, each of which is stored using 8 bytes of memory. The device is further assigned an encrypt code, should the data stored therein be encrypted, which is stored using 4 bytes of memory. The user name is stored using 20 bytes of memory, and the user's language is stored using 1 byte of memory. The user's speech file containing at least two passwords or passphrases is stored using 50 bytes of memory. The user's identifying data, used for knowledge-based questions is stored using 4 bytes of memory. The identifying data is typically descriptive data as described above, as well as answers to the previously asked knowledge-based questions. The issue date and fulfillment center that issued the AUD 2 are stored in 5 bytes of memory. The type of user that the AUD 2 is assigned to, either an adult or child, and that user's status, primary or subordinate, is stored in 6 bytes of memory. Access numbers are the telephone numbers that the AUD 2 calls to reach a UVS 12. An original, or seed access number is used by an algorithm for generating subsequent access numbers, each of which connect the user to the UVS 12. In one embodiment, the algorithm will increment the access number by a constant multiple, e.g. last digit of number plus two. The access number dialed by the AUD 2 facilitates the UVS 12 in determining whether the user is authentic.

TABLE I

| Field | Qty | Bytes | Extension |
|---|---|---|---|
| Device # | 1 | 8 | 8 |
| Body # | 1 | 8 | 8 |
| Encrypt Code | 1 | 4 | 4 |
| User Name | . | 20 | 20 |
| Language | 1 | 1 | 1 |
| Speech File | 1 | 50 | 50 |
| Identification File | 8 | 4 | 32 |
| Issue Date | 1 | 3 | 3 |
| Fulfillment Center | 1 | 2 | 2 |
| Type/Status | 1 | 1 | 1 |
| Original Access # | 1 | 15 | 15 |
| | | Total | 116 |

Figure 2A:
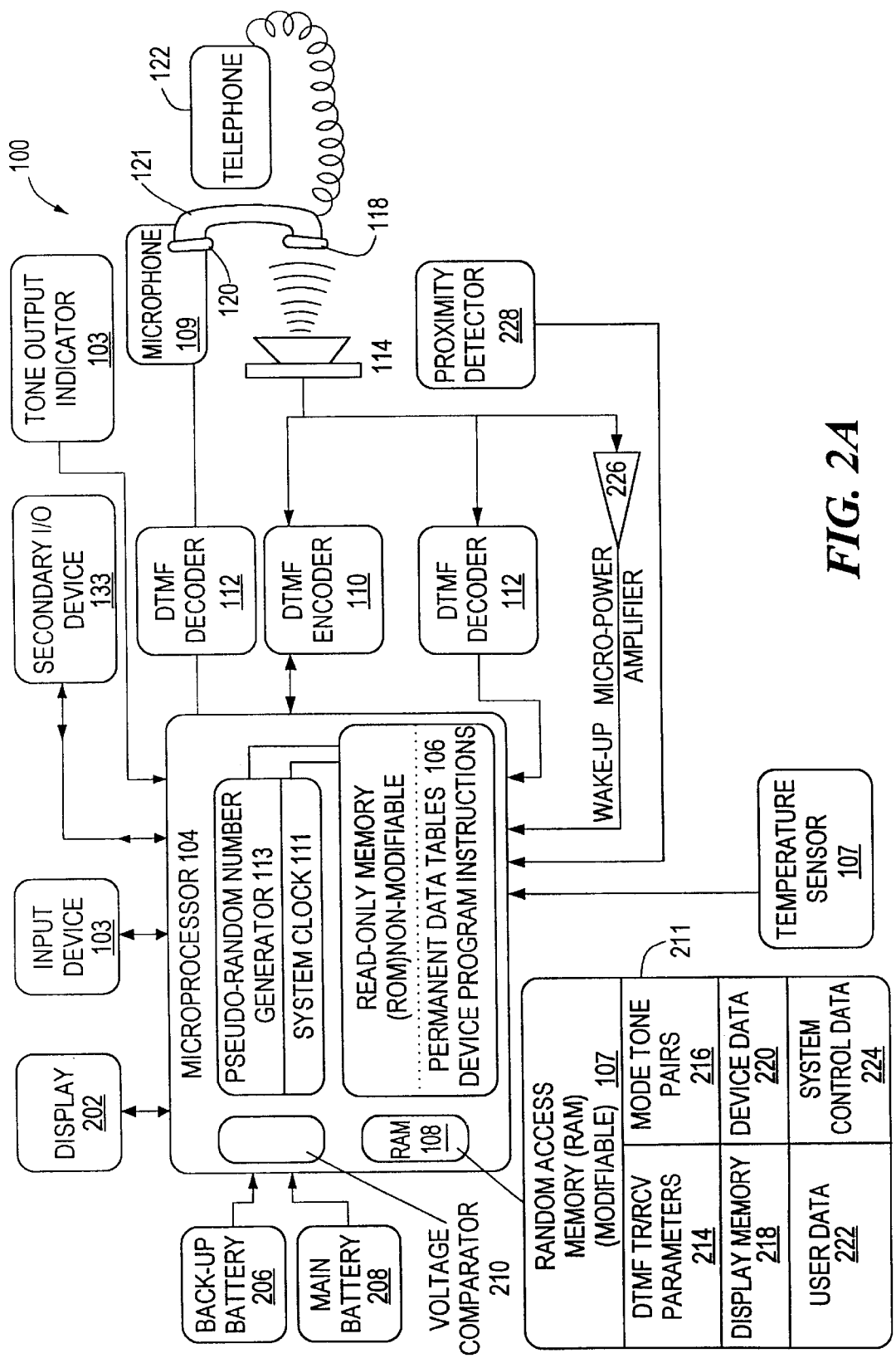
FIG. 2A is a block diagram of an embodiment of the user-activated AUD in use with a telephone.

Referring to FIG. 2A, the basic processing elements in the AUD 2 are illustrated, in accordance with one exemplary embodiment of the present invention. The AUD 2 comprises a microprocessor 104 coupled to a read only memory (ROM) 106, an input device 105, e.g., input keys, and a volatile random access memory (RAM) 108. The ROM 106 may be located within the microprocessor 104 or externally thereto. The microprocessor 104 receives input signals from a user by way of input device 105, as further described below. These signals upon receipt, are stored in the RAM 108 or processed by the microprocessor 104 using other information and programs stored in the ROM 106.

For the purposes of the discussion to follow, the tone pairs which are used for standard tone based switching systems are designated DTMF. Tone pairs which are utilized by the AUD and UVS which include DTMF tones as well as modifications to DTMF tones are designated dtmf. The AUD 2 comprises a dtmf encoder 110 and dtmf decoders 112, one of which has an input coupled to a speaker 114 and an output coupled to the microprocessor 104, the other of which has an input coupled to a microphone 109 and an output coupled to the microprocessor 104. In the illustrated embodiment, the speaker 114 serves as both an input device for receiving acoustic signals, such as dtmf tones, and as an output device for outputting signals such as dtmf tones and other signals generated by the encoder 110. Alternatively, the microphone 109 can be used for receiving audio signals with the speaker 114 being used only for outputting signals.

The AUD 2, in one embodiment, is acoustically coupled to a standard telephone 122 such as a public pay phone. When receiving signals from the handset 121, the speaker 114, which serves as a transducer, is positioned in close proximity to the handset's speaker 120 and while sending signals to the handset's microphone 118, the speaker 114 is positioned in close proximity to the microphone 118. Thus, to change between the send and receive functions, in the illustrated embodiment, a user moves the AUD 2 from being in close proximity to the microphone 118 to a position where it is in close proximity to the speaker 120. Alternatively, the microphone 109 can be included for the receipt of data in addition to the speaker 114. In accordance with such an embodiment, data may be received and transmitted simultaneously by the AUD 2 without the requirement of moving the AUD 2.

The AUD 2 is designed to acoustically monitor its output and perform an auto-calibration sequence at the beginning of each period of use that follows a period of dormancy of a preselected time period, or when the AUD 2 is used at certain predefined temperatures. For example, after a number of hours or days of inactivity, or alternatively when the AUD 2 senses a temperature outside of a preselected temperature range, the auto-calibration sequence permits the AUD 2 to compensate its signal levels for the temperature at which it is expected to work. Such compensation ensures smooth operation, as battery voltage output varies as a function of temperature, with variations in battery voltage output being particularly noticeable in cold weather. Other components of the AUD 2 such as the housing and the membrane of the speaker, may also be subject to the effects of temperature and may require calibration.

In more detail, the AUD 2, in one embodiment further includes a display device 202 for displaying data and other information output by the microprocessor 104, a main battery 208 for powering the AUD 2, a back-up battery 206 for supplying power to the microprocessor 104 as well as other system components, and a voltage comparator 210 for detecting the condition of the main and backup batteries 206, 208.

The AUD 2 further includes a micro-power amplifier 226 coupled to the output of the speaker 114. The amplifier 226 serves to provide a wake-up signal to the microprocessor 104 as described below. The amplifier 226 generates a signal in response to a signal generated by the speaker 114 in response to received acoustic signals. The signal output by the amplifier 226 causes the microprocessor 104 to become fully active from, a "sleep mode" that is automatically entered into after a long period of inactivity in order to conserve power. In an alternative embodiment, an input of the microprocessor 104 is coupled to a light sensor or other activation device such as a radio frequency sensor, which causes the microprocessor 104 to become fully active in response to an outside stimulus which may be provided by, e.g., a light or sound source associated, for example, with a telephone device. Thus, in accordance with such an embodiment, the AUD 2 can be made active by the excitation of a transducer or other sensor, by, e.g., a light, radio frequency signal or the receipt of an acoustic signal having a pre-defined frequency and a minimum, pre-defined intensity level. These pre-defined levels or values are a matter of design choice and are programmed into the ROM 106, preferably at the time of manufacture. The wake-up signal ensures that the AUD 2 is fully active when the user wants to gain access to a service.

The ROM 106 preferably includes a series of volatile memory locations that contain information that serves as a set of permanent data tables, as well as computer program instructions for controlling the operation of the microprocessor 104. The RAM 108 has dedicated volatile memory space for storing dtmf transfer and receive parameters 214 used for encoding/decoding signals, information 216, such as, frequency information relating to tone pairs, display memory 218, device data 220, such as the numeric and alpha-numeric sequences described in Table I, which identify the particular AUD 2, manufacturing date information, user identifying data 222, and system control data 224, such as calibration parameters. The RAM 108, also has modifiable memory 107 that is used to store information that is user or device dependent, is likely to change, or for other reasons is more easily stored in an alterable memory device. Stored in the modifiable memory 107 is data that includes destination phone numbers and billing information relating to the individual who is authorized to use the AUD 2, long distance carrier information, area code information, data encoding/decoding information, and credit or service related information. The RAM 108 is also a write area for the ROM 106.

Figure 2B:
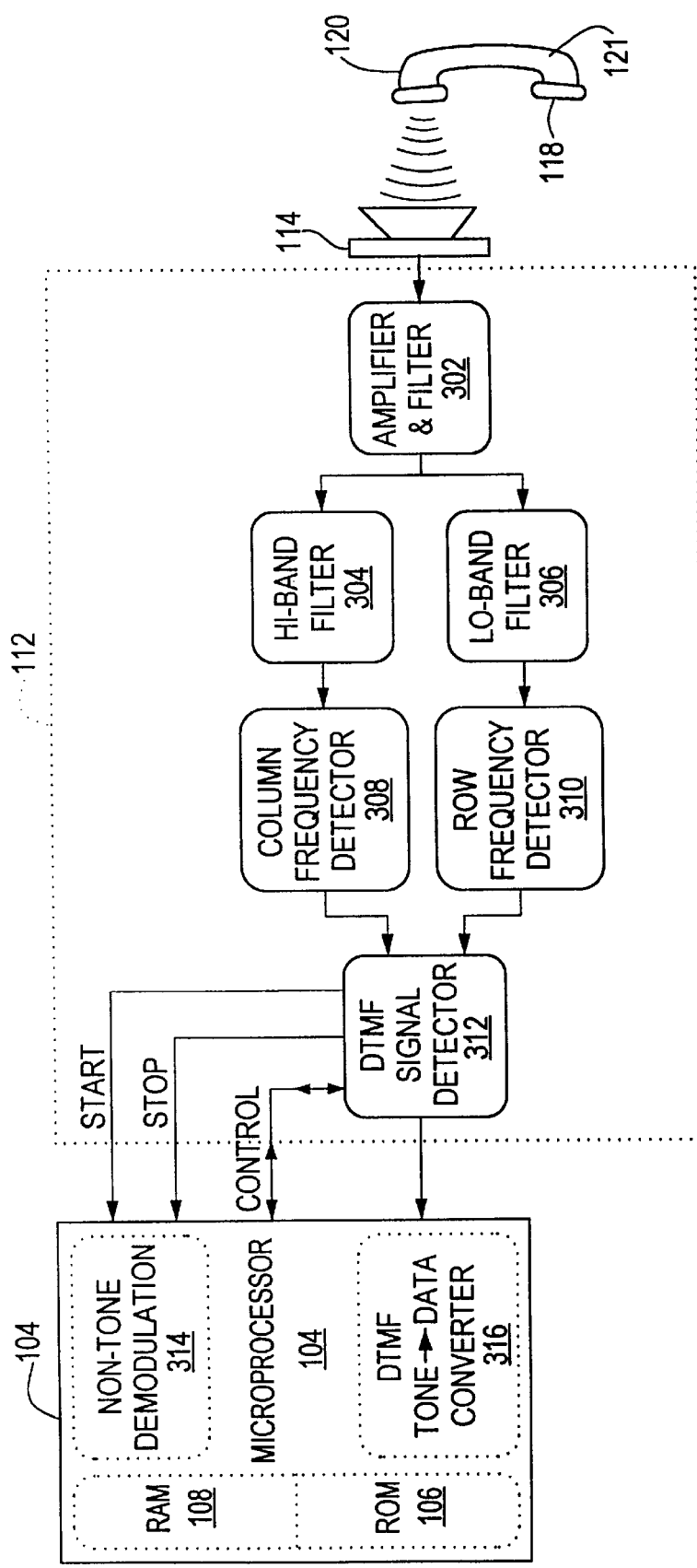
FIG. 2B is a block diagram illustrating an embodiment of the dtmf decoder components of FIG. 2A and the associated data path taken when the AUD is used for data reception.

A more detailed description of an embodiment of the dtmf decoder device 112 illustrated in FIG. 2A will now be described with reference to the schematic block diagram of FIG. 2B. As illustrated in FIG. 2B, the dtmf decoder device 112 comprises a combination amplifier and filter device 302 that has an input coupled to the output of the speaker 114 and its output coupled both to the input of a high band passband filter 304 and a low band passband filter 306. In this embodiment, the speaker 114 acts as a transducer converting acoustic signals received from the speaker 120 of the telephone handset 121, into electrical signals which are amplified and filtered by the device 302 and then further filtered by the passband filters 304, 306.

The high band passband filter 304, is designed to pass the corresponding high band frequency dtmf signals while eliminating noise and other signals. Similarly, the low band filter 306 is designed to pass the low band frequency dtmf signals and to eliminate other signals. In this manner, the low band and high band signals are segregated from each other with noise (signals having frequencies outside the bands of the dtmf signals) being removed to facilitate the later decoding of the signals.

As briefly discussed above, the acoustic signals emanating from the speaker are typically generated using a dual tone multifrequency (dtmf) encoding technique, which generates two tones such that one tone is selected from a high frequency band group and the other tone is selected from a low frequency band group. In standard telephone systems, the high frequency band group includes four frequencies, nominally 1209, 1336, 1477, and 1633 Hz while the low band frequency group includes four low frequencies, nominally 697, 770, 852, and 951 Hz. Each of the high and low frequencies is referred to as a fundamental frequency. These frequencies are nominal frequencies for error avoidance purposes.

Each one of the low frequencies corresponds to one of the four rows of keys on a standard extended telephone keypad while each one of the four high frequencies corresponds to one of the four columns of keys on standard extended telephone keypads. Accordingly, low frequency tones represent row tones and high frequency tones represent column tones. Extended keypads include the additional fourth column of keys not found on non-extended standard keypads such as those commonly used with public telephones and household telephones, although these additional tones are found in most modem hardware/software systems. Each different telephone key is represented by a signal including a unique combination of one tone from the high band and one from the low band. Sixteen different signal states may be represented by this encoding technique with one signal state corresponding to each one of the sixteen keys that can be found on a standard telephone keypad.

To be a valid signal, the received tone signal must contain exactly one valid tone from each of the low and high band frequency groups, and each of the low and high tones must be present for a minimum time duration, typically at least 35–40 milliseconds. The signal, containing a valid tone signal from each of the low and high frequency band groups, is referred to as a tone pair, which will be further described below. Additionally, the difference in amplitude between the low and the high tone, known as the "twist", must fall within a predetermined range. Typically the high band tone cannot be greater than 4 dBm more or 8 dBm less than the low band tone signal power level, where dBm is a logarithmic measure of power with respect to a reference power of 1 milliwatt. Additionally, the amplitude level of each tone signal in the tone pair must be in the range of 0 to −25 dBm. Consecutive tone-pairs, each representing a different digit to be transmitted are typically separated by a period of silence equal to a tone-off period required for standard DTMF decoding. Typically the period is within the range of 25 to 50 milliseconds.

Referring again to FIG. 2B, an output of the high band filter 304 is coupled to the input of a column frequency detector 308 for detecting which frequency of the set of high band tone frequencies is being received. Similarly, the low band filter 306 has an output coupled to an input of a row frequency detector 310 for detecting which frequency of the set of low band frequencies is being received. In particular embodiments, the column and row frequency detectors 308, 310 as well as high and low band filters 304, 306 may be designed to recognize and pass additional or substitute high band and low band tones, respectively, which are outside the range of standard DTMF tones to thus increase the number of signals that can be used to transmit data to add additional security, increase data transmission rates, or provide additional features.

An output of the column frequency detector 308 and an output of the row frequency detector 310 are coupled to corresponding inputs of a dtmf signal detector 312. The dtmf signal detector 312 receives the low band and high band tones output by the column and row frequency detectors 308, 310 along with information signals indicating the frequency of the received tones. The dtmf detector 312 determines if the received tones constitute a valid tone pair or other signal which the dtmf signal detector 312 is programmed to recognize. If the dtmf signal detector 312 detects a valid tone pair or a signal it recognizes, it sends a signal to a tone to data converter 316 of the microprocessor 104 to convert the detected dtmf tone or signal into the data it represents, e.g., a symbol or number.

Because the AUD 2 is programmable, it can be reprogrammed to accept one or more signals as valid tones. In one embodiment, a signal characteristic (e.g. maximum tone-length) may be remotely modified by the acoustic reprogramming of the AUD 2 in response to the AUD 2 receiving a series of predetermined dtmf tones. Such tones act as a signal or key which is required to enable the reprogramming of the AUD 2. Alternatively, the AUD 2 can include an IR receiver (not shown) to accept IR radiation signals for reprogramming. In addition, because the AUD 2 is designed to be both responsive to, and capable of, generating audio tones, e.g., both standard and encoded DTMF tones, the AUD 2 is capable of receiving, storing and transmitting both standard and encoded DTMF tones for a variety of purposes. Such purposes include the use of such tones as "keys" to enable certain functions of the AUD 2 or the device which the AUD 2 is used to communicate with. Alternatively, these tones may include tones other than those used for standard DTMF signals. To prevent fraudulent tampering with the AUD, it can be programmed to reject or ignore input data that does not conform to predetermined signal characteristics which are stored in the RAM 108 of the AUD 2. In another embodiment, it can be programmed to cease fuctioning in the event that the input data does not conform to such predetermined characteristics.

In one embodiment, the dtmf signal detector 312 of the present invention is able to monitor alterable characteristics of a dtmf signal, such as the signal twist, which is the difference in the amplitude of the low band tone and the high band tone, as well as the low band and high band tone duration, and tone frequencies. By monitoring such alterable characteristics, information may be encoded into the dtmf signal without affecting the ability of a standard DTMF signal detector, for example in a central switch, to detect the symbol/number represented by a DTMF tone pair. If the dtmf signal detector 312 detects encoded information, the encoded information is supplied to the dtmf tone to data converter 316 for processing. A particular signal or sequence of tones is used in some embodiments to provide an indicator signal to indicate to a receiver that encoded dtmf signals are being transmitted. In such embodiments, a dtmf signal detector detects the receipt of encoded dtmf signals by monitoring a received signal for such an indicator signal or indicator sequence of tones.

The dtmf signal detector 312 also has start and stop signal outputs coupled to corresponding inputs of a non-tone demodulation circuit 314 of the microprocessor 104. In this manner, the non-tone demodulation circuit 314 receives timing information concerning the starting and stopping of each received signal. This information can be used, in accordance with one embodiment of the present invention, for decoding information encoded into one or more dtmf signals and/or for distinguishing of a string of signals which represent meaningful data as opposed to nonsense signals added for security reasons as well as to enable the device to provide non-frequency dependent data that is encoded into the inter-digit periods, i.e., the time between dtmf tone pairs.

Referring to FIG. 2C, the microprocessor 104 and a dtmf encoder 110 illustrated above in FIG. 2A, will now be described in greater detail. The dtmf encoder 110 comprises a high frequency register 424, a tone select register 426, and a low frequency register 428. The high and low frequency registers 424, 428 have a first input coupled to a data output of the microprocessor 104, a second input coupled to a tone select output of the microprocessor 104 and a third input coupled to a tone select signal output of the tone select register 426. The tone select register 426 receives tone signal information from a tone store output of the microprocessor 104 which is then processed to generate a control signal which is supplied to the low and high frequency registers 424, 428 through the third input of the registers 424, 428. The high and low frequency registers 424, 428 are responsive to signals received from the microprocessor 104 and the tone select register 426 to produce a control signal indicating the fraction of the microprocessor's clock frequency that the desired high and low tones correspond to.

The high band tone of each dtmf tone signal pair is generated by a high band frequency signal generation circuit 401. The high band frequency signal generation circuit 401 comprises a programmable divider 430, whose output terminals are coupled to a Johnson counter 434. The output terminals of the Johnson counter 434 are coupled to digital to analog converter 438 which has an output coupled to an amplifier 458. The amplifier 458 is responsible for amplifying the high band dtmf tone signals of each tone pair.

The programmable divider 430 receives as input signals the output of the high frequency register 424 and the microprocessor's oscillator. Using the control information provided by the high frequency register 424, the programmable divider 430 generates a pair of digital signals having the desired frequency of the high band tone to be generated from the oscillator signal. The digital signals are then further processed by the Johnson counter 434 before being converted into analog signals by the D/A converter 438. The analog high tone output signals, output of the D/A converter 438, are amplified by the amplifier 458 which has a gain control input coupled to a high band amplitude control signal output of the microprocessor 104.

As discussed above with respect to the generation of high-band frequency signals, low-band frequency signals are generated in a similar manner. Low-band frequency signal generation device 403 comprising a programmable divider 432, a Johnson counter 436, a (D/A) digital to analog converter 440, and an amplifier 460 is responsive to the output of the low frequency register 428, the microprocessor's oscillator, and the microprocessor's low band amplitude control signal, to generate a pair of low band dtmf tones in the same manner as described above with regard to the generation of high band dtmf tones.

Figure 3A:
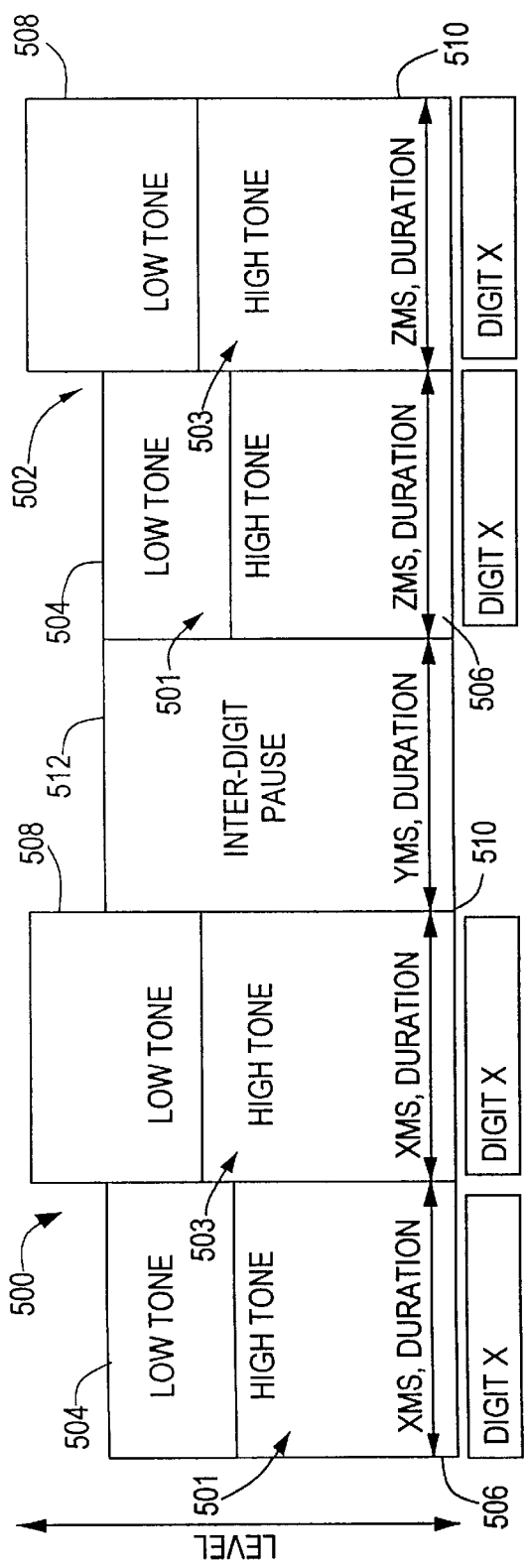
FIG. 3A is a diagrammatic representation of an embodiment of tone pairs generated by the AUD of the present invention.

Referring to FIG. 3A, illustrated are a pair of tone groups 500, 502 transmitted by the AUD 2 over the telephone network. As shown, the first tone pair 501 comprises a low tone 504 and a high tone 506, amplified to different amplification levels. For example, first tone pair 501 can be amplified to compensate for the transmission characteristics of an electret microphone. Similarly, adjacent to the first tone pair 501 is a second tone pair 503 comprising a low tone 508 and a high tone 510 amplified to different amplification levels to compensate for the transmission characteristics of a carbon microphone. Furthermore, there are channel conditions under which a tone pair normally targeted for a carbon microphone compensates for the transmission characteristics of an electret microphone, and vice versa. Together, the tone pairs form a tone group 500, as stated above. In this embodiment of the invention, the duration of the tone group 500 is roughly 90 ms separated by a period of 45 ms which is an inter-digit pause 512.

During the inter-digit pause 512 various other identifying data can be transmitted. By using high or low tones that are outside of the standard range for standard high or low tones used for DTMF signals, it is possible to encode data into a tone signal by asserting such high and low tones during the inter-digit period without affecting the ability of a standard DTMF detector to detect an in-range tone signal. Alternatively, as described in further detail below, the tone signals transmitted during the inter-digit pause perform channel normalization. After 45 ms, another tone group 502, comprising similarly amplified tone pairs 501, 503 is transmitted followed by an inter-digit pause 512. During the inter-digit pause, the UVS 12, as shown in FIG. 1, samples the ambient noise. The ambient noise can be noise generated in the environment around the telephone handset, or noise generated from on-line systems. The tone signals later received at the UVS 12 can be corrected to eliminate such noise.

Referring again to FIG. 2C, the degree of amplification performed by each of the amplifiers 458, 460 is controlled by the microprocessor 104. In this manner, the microprocessor 104 can compensate for spectral transmission inefficiencies as well as introduce intentional twist (i.e. amplification level difference between the low tone and the high tone), into the dtmf signal being generated and/or encode information into the dtmf signal by selectively varying signal strength with the tone pairs comprising the dtmf signal being generated. More specifically, to compensate for spectral transmission inefficiencies, the microprocessor 104 retrieves amplification levels stored in memory to compensate for the transmission characteristics of microphones typically used in a public telephone system. Typically used are electret microphones and carbon microphones, each having specific transmission deficiencies associated therewith. These microphones are commonly used in standard telephone handsets because of their low cost and high degree of reliability. Carbon microphones typically require a substantially higher level low tone to compensate for their inefficiency at lower frequency. Thus, amplification levels specific to such types of microphones are stored in memory 108 and retrieved by the microprocessor to set the level of amplification of the amplifier. The amplifier then amplifies each of the high frequency tone signals and low frequency tone signals for a tone pair group to predetermined amplitude levels, one amplitude level being specific to the transmission characteristics of a carbon microphone and another amplitude level being specific to the transmission characteristics of an electret microphone. Thus, each of the high frequency and low frequency tones are amplified to correspond to the type of microphone being used.

The output of each of the amplifiers 458 and 460 comprise at least two pairs of high band and low band tones, respectively. The tone pairs are then supplied to amplifier 452 for additional amplification. The amplifier 452 has a control input which is coupled to a timing control output of the microprocessor 104. As shown above, one of each of the low tone signals and one of each of the high tone signals are joined to form a tone pair by timing the amplifier, 458, 460 to sequentially output the tones. After a first tone pair is created, a second tone pair is created immediately following the first tone pair. Each tone pair has a duration of 45 ms. The two tone pairs form a tone group. Preferably, when a plurality of tone groups are transmitted over a telephone network, a period of 25–55 milliseconds elapses between each tone group, preferably a period of 45 milliseconds elapses. After the tone groups are transmitted over the telephone network, they are routed by the central switch to an intended destination.

When a tone pair is amplified to compensate for the transmission characteristics of a carbon microphone is transmitted through an electret microphone, it will be either viewed as out-of-band or in-band by the dtmf receiver. If viewed as out-of-band, the receiver ignores the tone pair. Alternatively if viewed as in-band, it will be treated as the beginning or continuation of the adjacent tone-set. The detection of a tone pair specific to the transmission characteristics of an electret microphone when transmitted through a carbon microphone will be treated by the dtmf receiver in a similar manner.

The timing control output generates an output signal that is used to control the amount or level of amplification the amplifier 452 provides. Furthermore, by asserting the timing control signal, the microprocessor 104 activates the amplifier 452 during periods of data transmission. On the other hand, when the speaker 114, which has an input coupled to the output of the amplifier 452, is being used as a receiving device or when the microphone 109 is used, the microprocessor 104 deasserts the timing control signal thereby deactivating the amplifier 452 and thus the output of the dtmf tone encoder 400. The timing control signal may also be used to inhibit signal output during the inter-digit periods.

Notwithstanding the transmission problems described above, another source of transmission errors are related to unwanted harmonics produced by microphones and, generally referred to as the "third tone" problem. This problem is associated with the detection of a third, otherwise valid tone, at the detector stage of a receiver where a DTMF tone signal is being decoded. Such errant third tones can cause errors in some tone detection receivers, and particularly those systems which do not utilize digital signal processing equipment for tone detection. As stated above, a DTMF tone signal is only considered valid if it includes a single pair of valid tones, e.g., one valid high band tone and one valid low band tone. Thus, when multiple valid high band or low band tones are received at the same time, the DTMF signal is considered invalid and can not be properly decoded. Often this problem is present when DTMF signals are generated using the numbers 3 and 6 on a standard telephone handset. In one embodiment of the invention, the access numbers dialed by the AUD 2 eliminate the use of 3 or 6. In other embodiments, the relative amplitude of a received tone is compared to the other received tones and is used to distinguish valid tones from erroneous invalid tones. This process however, requires intelligent digital signal processing of signals which is not available on many local loops.

The third tone problem is typically found when a carbon microphone is used as a transducer of DTMF tones. Carbon microphones often generate and transmit erroneous third tones, in addition to the tones actually received by the microphone. As DTMF tone signals are transmitted through the carbon microphone, the carbon granules within the carbon microphone vibrate in relation to the driving frequencies. As a result of the harmonic effect of the varying vibrations of the granules, various residual tones are generated, with the third tone being the most powerful of these residual tones. This third tone can be relatively powerful, e.g. as much as one half the power level of the higher of the two received acoustic DTMF tones passing through the microphone. The frequency of this unwanted harmonic, will normally be the arithmetic difference between the frequencies of high band and Low band tones being received by the carbon microphone.

To compensate for third tone problems, in one embodiment, the dtmf tone encoder 110 in one embodiment, produces frequencies which still fall within the industry-acceptable tolerance of DTMF signals but which have an arithmetic difference falling outside of the permissible DTMF range. In creating such frequencies, the unwanted harmonic falls outside of the sensitivity range of the dtmf receiver. This is achieved by selecting the nominal center frequencies of the low and high frequency tones, towards the outer edge of the "accept range" of standard DTMF detector devices. The microprocessor 104 can perform this function by being programmed to select and control the generation of DTMF tones of various tone pairs, so that the tones of a tone pair fall within the accept range of conventional detectors, but create an arithmetic difference which is outside the tolerance range of such detectors.

Figure 3B:
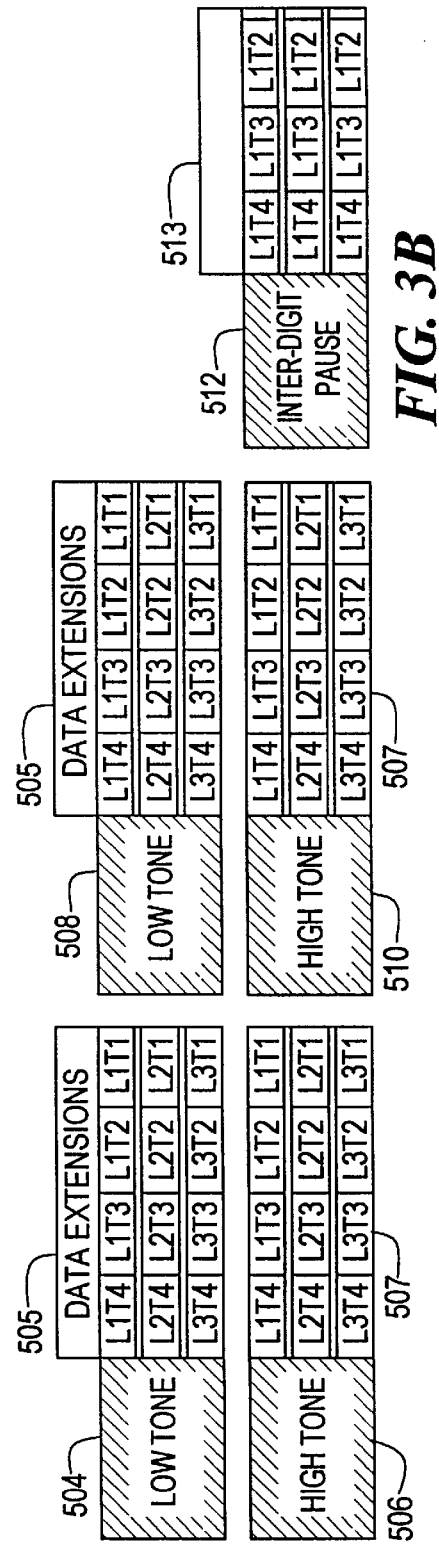
FIG. 3B is a diagrammatic representation of the tone pairs and the data extensions in the gaps between tone pairs.

FIG. 3B is a diagrammatic representation of the tone pairs and the inter-digit pauses, and the data extensions associated therewith. As stated above, DTMF tones comprise a high tone selected from a high frequency band group and a low tone selected from a low frequency band group. For example, the digit one is transmitted by a combination of the fundamental frequencies of 697 Hz and 1209 Hz. A central switch will recognize this as a "1" typically if the period of the tones are 45 ms, and the amplitude is zero. After the 45 ms duration has passed however, data extensions may be incorporated into the tones to convey additional information that will be ignored by the central switch, but can be decoded for information at a user verification system. This additional information can be identifying information for use in determining whether answers given to knowledge-based questions, as further described below, are correct.

The data extensions 505, 507 extend the duration of each of the tones 504, 506, 508, 510 and/or the change the amplitude of each of the tones to covey such additional information. As shown for each of the low tones 504, and each of the high tones 506, three amplitude levels LT1, LT2, LT3 are available in 10 millisecond increments for a total of 40 ms. Therefore, a data extension could extend from the high tone 504 at the third amplitude level for an additional 40 ms after the 45 ms period of the tone pair 501 has ended, to transmit additional data. Likewise, at the same time, a data extension could extend from the low tone 506 at the first amplitude level for only 10 ms after the 45 ms period, to transmit additional data. As additionally shown, within the inter-digit period 512, information can also be transmitted using data extensions 513. As shown at the end of the inter-digit period 512, a single tone 513 can be transmitted which will be disregarded by the central office, because it is not a combination of tones that would be recognized as designating a digit. Like the data extensions 513 described above, the duration of the tone and/or the amplitude level of the tone can be modified to transmit additional data to the user verification system (not shown in this figure).

Figure 4A:
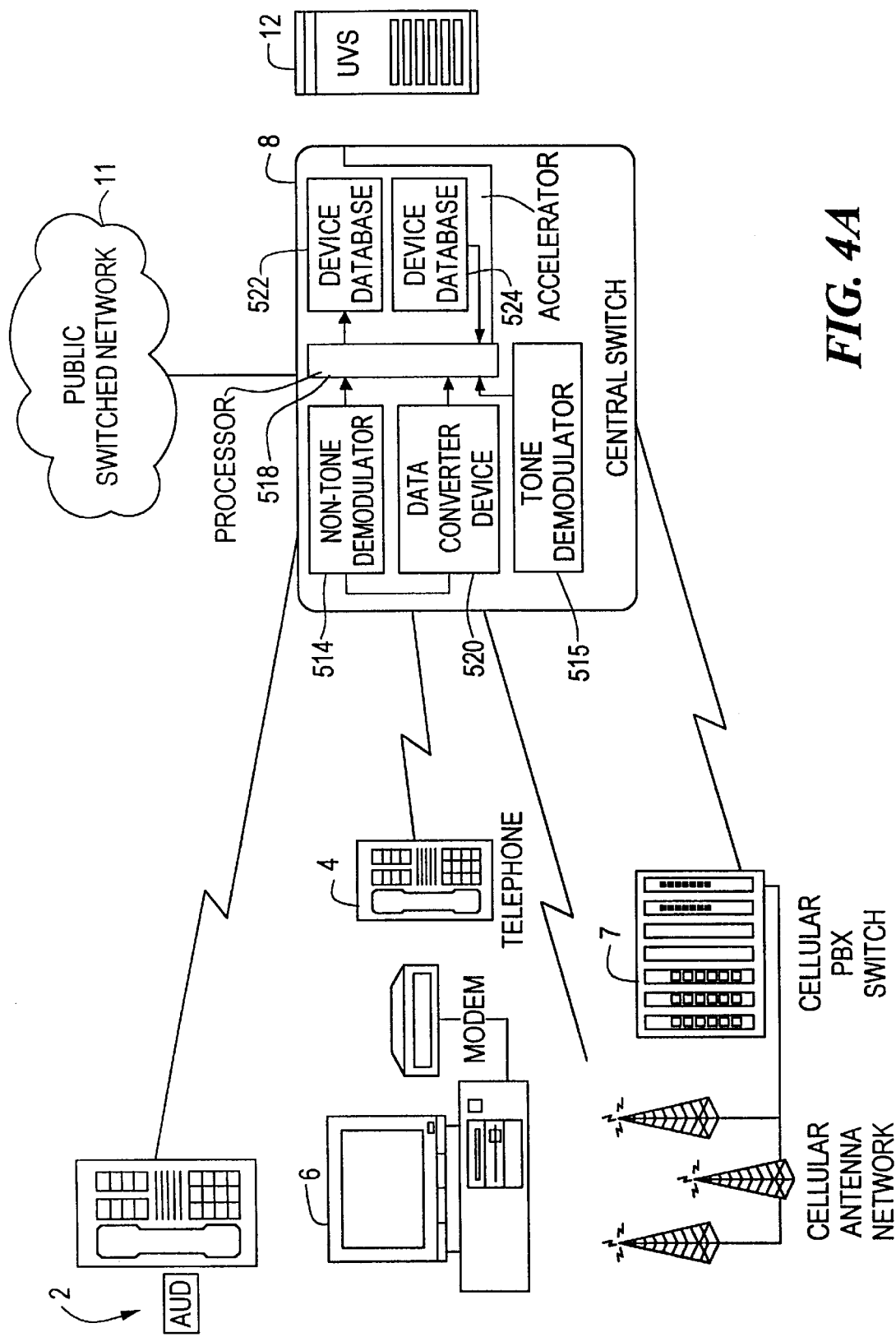
FIG. 4A is a block diagram showing a telephone network central switch configured on the telephone network with the user-authentication system of the present invention.

Referring to FIG. 4A, a block diagram of one embodiment of the configuration of a network having a central switch and a user-authentication system of the present invention is illustrated. As previously described, the AUD transmits tone signals from a telephone 2 or 4, a computer 6, or a cellular phone 7 which routes the tone signals via a cellular switch 9, over the telephone network to a central switch 8. At the cellular switch 9 certain preliminary security measures can be imposed before the tone signals are routed to a UVS 12, to prevent a call from reaching the UVS if the user's authenticity is substantially in question. As shown, the central switch 8 is part of a public switched network 11, and aids in routing the tone signals to a local UVS 12. The central switch 8, upon receipt of the tone signals, determines the destination of the call.

In more detail, the central switch 8 has electronic hardware for processing the tone signals and routing them to the designated UVS 12. The central switch 8 includes a non-tone demodulator 514 for monitoring alterable characteristics of the tone signals and decoding information. The central switch 8 further includes a processor 518 coupled with the tone demodulator 515, a dtmf tone to data converter device 520 and a database, that typically includes a device database 522 and a billing database 524. Upon receipt of a tone signal, it is demodulated by the tone demodulator 515 and digitally converted to data. The device database 522 contains for example, information concerning locally accessible UVSs, long-distance accessible UVSs, as well as information relating to the body number or device identification number of valid AUD devices, and encoding schemes used by each AUD listed in its database. After demodulation and conversion has occurred, the processor 518 at the central switch 8 communicates with the device database 522 which aids in determining where and how the signal should be routed. The central switch 8 routes the tone signals to an intended UVS 12, which is preferably accessible over the local network, but may be accessible over a long-distance network if necessary.

Figure 4B:
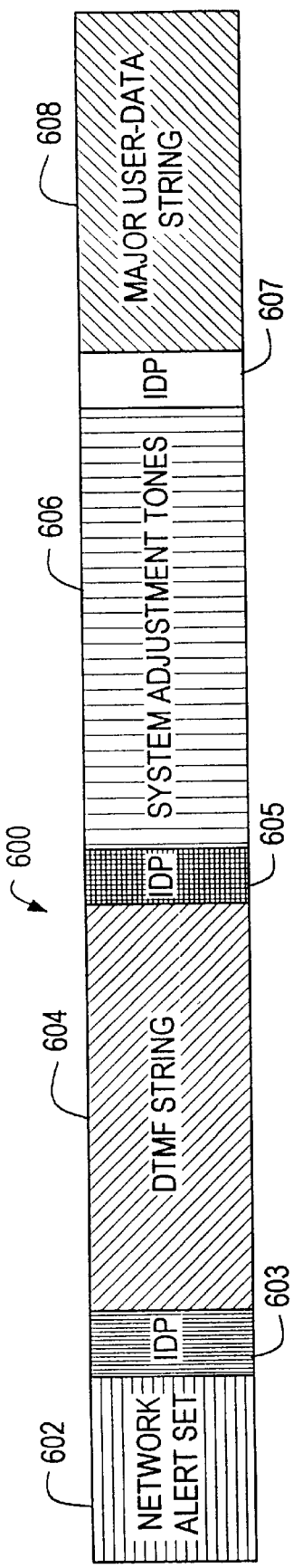
FIG. 4B is a diagrammatic representation of the format of tones transmitted from the user-activated AUD.
Figure 5:
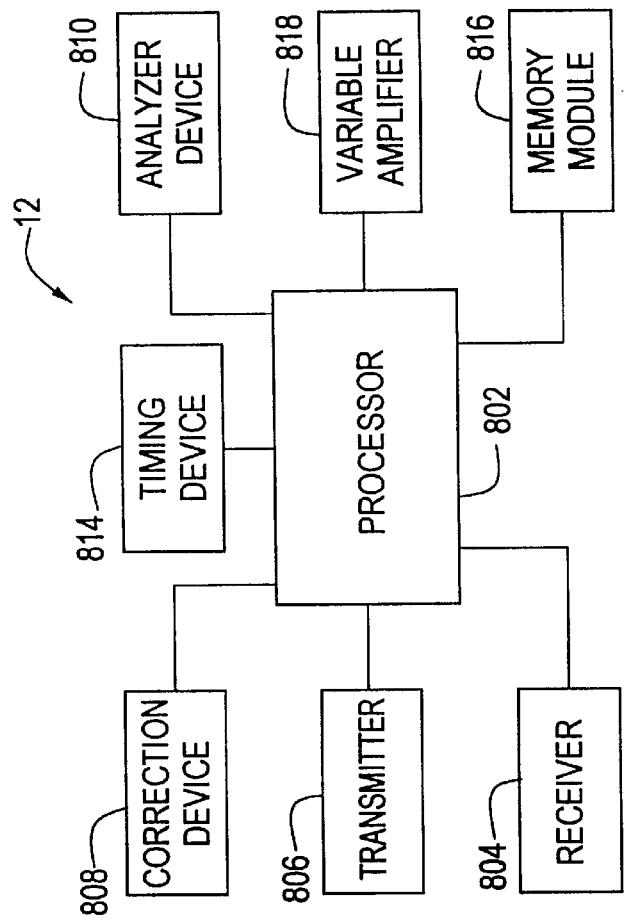
FIG. 5 is a block diagram of an embodiment of the components of a user-verification system.

Referring to FIG. 4B, illustrated is a diagrammatic representation of the format of the tone signals 600 transmitted to the central switch by the AUD. As shown, the tone signals 600 include a system alert tone signal 602 representing that the message requires user-verification and should be transmitted to a UVS. In one embodiment, the alert tone 602 is followed by identification tone signals (not shown) representing the identity of the AUD and the identity of the authorized user. Inter-digit periods 603, 605, 607 between the identification signals can be used to transmit miscellaneous data in the form of tone signals as described previously. In this embodiment, the inter-digit periods 603, 605, 607 preferably transmit user-related data or data that aids the central switch 8 in transferring the data to the UVS 12. Following the inter-digit period 603 is a dtmf string 604 that provides the destination number of the UVS 12. The destination data 610 preferably includes the numerical system of the phoneme string, a destination number related to a UVS 12, as well as a carrier designation indicating which telephone carrier should transmit the tone signals to the intended UVS 12. The dtmf string 604, can for example, take the form of a plurality of dtmf signals having inter-digit periods of variable duration, enabling additional data such as memory allocation tables, to be transmitted therewith. Following the next inter-digit period 605, system adjustment tones 606 are transmitted to normalize the channel, as will be further described below. The system adjustment tones can comprise tones of single, dual or multiple frequencies. Following the next inter-digit period 607, the user's speech verification file 608 is transmitted as a plurality of tone signals. This file 608 preferably includes voice-related data such as user-selected passwords or passphrases, as previously spoken by the user. In an alternate embodiment, the user's speech verification file 608 is accessible via the network and thus not transmitted by the AUD 2. The UVS 12 may contain the speech file in a memory module 816, as shown in FIG. 5, or a site on or accessible by the network (not shown) can be devoted to storage of speech files. In this manner, the tone signals described above would be transmitted by the AUD 2 without the user's speech verification file 608.

Referring again to FIG. 4A, upon receipt of these tone signals at the central switch 8, the tone demodulator 515 demodulates the tone signals and transmits them to the dtmf tone to data converter device 520, which transmits them to the processor 518. The processor 518 determines whether the alert tone (602) is recognizable. In determining whether the alert tone (602) is recognized by the processor 518, the processor 518 communicates with the database 522 to determine if the route and intended UVS 12 are stored, and therefore known to the central switch 8. If the database 522 indicates that the route and the intended UVS 12 are known, the central switch 8 routes the tone signals to the intended UVS 12. The tones used as alert tones set are preferably not among those commonly used in in-band signaling.

Should the database 522 not have data corresponding to the route and intended-user-verification data stored therein, the processor 518 does not recognize the alert tone (602). In such a scenario, the destination data is examined by the processor 518 so that the processor 518 can determine which UVS 12 is intended. After the processor 518 determines which UVS 12 is intended, the central switch 8 routes the tone signals over the public switched network 11. The central switch 8 indicates to other switches on the public switched network 11, that the tone signals are to be routed to a certain UVS 12. The tone signals are eventually transmitted to the intended UVS 12 often through a series of switches located on the public switched network 11.

Referring to FIG. 5, shown is a highly schematic block diagram of one embodiment of the UVS 12 of the present invention. As previously discussed in FIG. 1, the AUD 2 transmits tone signals to the central switch which routes the tone signals to the appropriate UVS 12. As shown in this figure, the UVS 12 includes a processor 802 in electrical communication with a receiver 804 which receives the tone signals from the AUD 2 and decodes them, a transmitter 806 which transmits signals to the network 808, and a variable amplifier 818 which corrects received signals. The processor 802 is also in electrical communication with a correction device 808, an analyzer device 810, and a timing device 814. A memory module 816, typically including RAM and ROM, is in electrical communication with the processor 802 and stores data represented by the tone signals received. The tone signals comprise data representing the user's speech file, as described below, along with data representing the user's identifying information and pin. In another embodiment of the invention, the processor 802 can include analyzing capabilities, correction capabilities and the ability to generate a timing signal.

As shown in the table below, the UVS 12 stores the speech file, personal identifying data, and pin. As shown, the AUD device number is stored, as well as the user type, e.g. whether the current user is a primary or subordinate. The access number and the primary user's telephone number is recorded, as such information can be used to preliminarily screen the user. For example, if the user is calling from his home phone, the likelihood of fraudulent use of the AUD is low, in contrast to when a user is calling from a pay phone geographically distanced from his home phone. The user's name and language are also recorded. At least two user speech files are recorded, each speech file containing a different password or passphrase, in the event that the UVS 12 chooses to rotate the passwords or passphrases that must be spoken by the user prior to authentication. Also recorded is identification data, which includes the user's previously recorded responses to identification questions. This data is useful, as further described in FIGS. 7B-1 and 7B-2, to authenticate a user when voice verification is problematic. Data relating to the subordinates are also stored, particularly, their name, any restrictive access requirements placed thereon by the primary, at least two speech files, and knowledge data, as described above. Similarly, if voice-verification is problematic, the knowledge data can be used to authenticate the subordinate.

TABLE II

USER DATA FIELDS

| Field | Sample | A/N/b | Source | Bytes | Rec'd |
|---|---|---|---|---|---|
| Application | 1A | B | AUD | 3 | Registration |
| Device or Number | 1234567890ABC | B | AUD | 12 | Registration |
| User Type | Primary | N | AUD | 1 | Registration |
| Source | 12334567AA | B | AUD | 10 | Registration |
| Primary User Home | 2127210332 | N | AUD | 5 | Registration |
| Primary Name | Jones | A | AUD | 3 | Registration |
| Primary Name | Lee | A | AUD | 3 | Registration |
| Primary Name | Ms | A | AUD | 1 | Registration |
| Language | 1 | N | AUD | 1 | Registration |
| Age | ADULT | A | AUD | 3 | Registration |
| Speech File No. 1 | DATA | | AUD/UVS | 100 | Registration |
| Speech File No. 2 | DATA | | AUD/UVS | 100 | Registration |
| Knowledge Data Q1 | 3228 | N | AUD/UVS | 2 | Registration |
| Knowledge Data Q2 | 212 | N | AUD/UVS | 2 | Registration |
| Knowledge Data Q3 | December | N | AUD/UVS | 2 | Registration |
| Knowledge Data Q4 | 10023 | N | AUD/UVS | 2 | Registration |
| Knowledge Data Q5 | 5 | N | AUD/UVS | 1 | Registration |
| Knowledge Data Q6 | 73 | N | AUD/UVS | 2 | Registration |
| Knowledge Data Q7 | November | N | UVS | 2 | Registration |

TABLE II-continued

USER DATA FIELDS

| Field | Sample | A/N/b | Source | Bytes | Rec'd |
|---|---|---|---|---|---|
| Knowledge Data Q8 | January | N | UVS UVS | 1 | Registration |
| Access Number | 18004782642 | N | AUD/ UVS | 15 | Manufacture |
| Restriction Subordinate | A2 | N | AUD | 3 | Registration |
| Subordinate Name | Car1 | A | AUD | 3 | 16 |
| Restriction | A2 | B | AUD | 3 | ADD (Primary) |
| Language | 1 | N | AUD | 1 | ADD (Primary) |
| Age | CHILD | A | AUD/ UVS | | |
| Speech File No. 1 | data | | AUD/ UVS | 100 | ADD |
| Speech File No. 2 | DATA | | AUD/ UVS | 100 | ADD |
| Knowledge Data Q1 | 3228 | N | AUD/ UVS | 2 | ADD |

Referring again to FIG. 5, the processor 802 in electrical communication with a receiver 804, receives decoded signals from the receiver 804 and determines if voice-related data is represented thereby, i.e. if the tones represent the speech file. As previously stated, the speech file includes a password or passphrase or a multiplicity of passwords or passphrases, previously spoken by the user and recorded in the AUD 2. Unfortunately, the transmitted tone signals are sometimes distorted in amplitude while traveling through the transmission channel, when received by the receiver 804 at the UVS 12.

To correct for such distortions, the AUD 2 communicates with the processor 802 on the system to compensate for the degree of amplitude distortion that takes place when tone signals are transmitted to the UVS 12. In one embodiment of the invention, the channel is normalized by the AUD 2 transmitting the speech file as a first plurality of standard tone signals to an intended UVS 12. The standard tone signals are a plurality of signals forming a spectral representation of the frequencies typically embodying a user's voice. The UVS 12, upon receipt of such signals compares the signals received with signals previously stored in memory module 816 that are representative of the user's voice to determine if any frequency or amplitude deviations have occurred during transmission. Amplitude deviations are typically more common than frequency deviations, and are generally a function of the distance an analog signal is transmitted over copper cable without amplification. In another embodiment, the AUD 2 transmits tones that enable the UVS 12 to normalize the channel. In one embodiment, the tone signals preferably have a predetermined amplitude that is known to the UVS 12. The UVS 12, upon receipt of such tone signals simply compares the received signal to the expected signal to determine the degree of distortion. Similarly, in yet another embodiment of the invention, the AUD 2 transmits normalizing tone signals during the interdigit periods 512 or pauses, previously described above.

In each of the above-described embodiments, in the event that amplitude deviations have occurred, the variable amplifier 818 in electrical communication with the processor generates amplification gain factors that compensate for the deviations in the amplitude of each of the plurality of tones transmitted. The compensation gain factors are thus stored in the memory module 816 for subsequent use to correct the tone signals representing a password or passphrase spoken into a microphone by a user. The user-verification processor 802, upon receipt of the signals representing a password or passphrase, amplifies the signals using the gain factors, and achieves an accurate representation of the user's voice prior to performing user-verification.

Figure 6A:
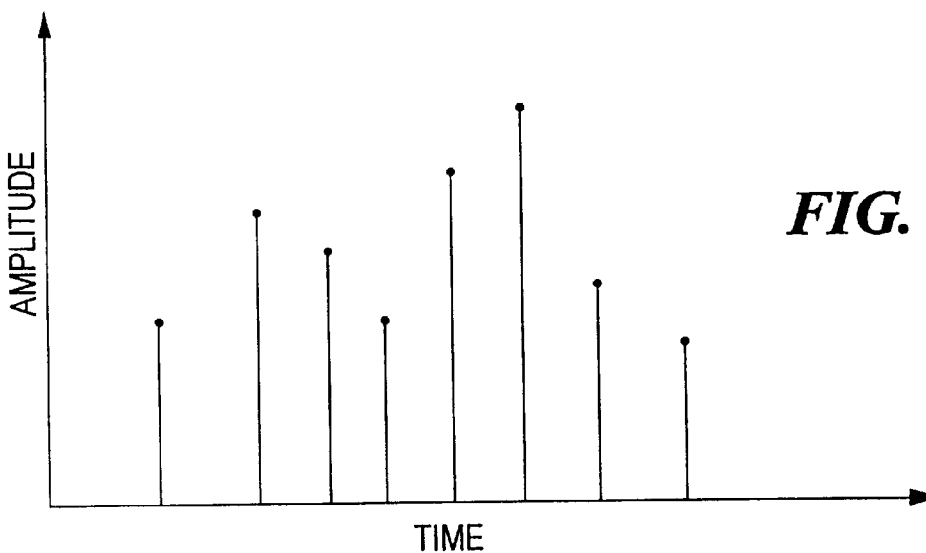
FIGS. 6A, 6B, and 6C are graphical illustrations of the process of correcting signals using standard tones.
Figure 6B:
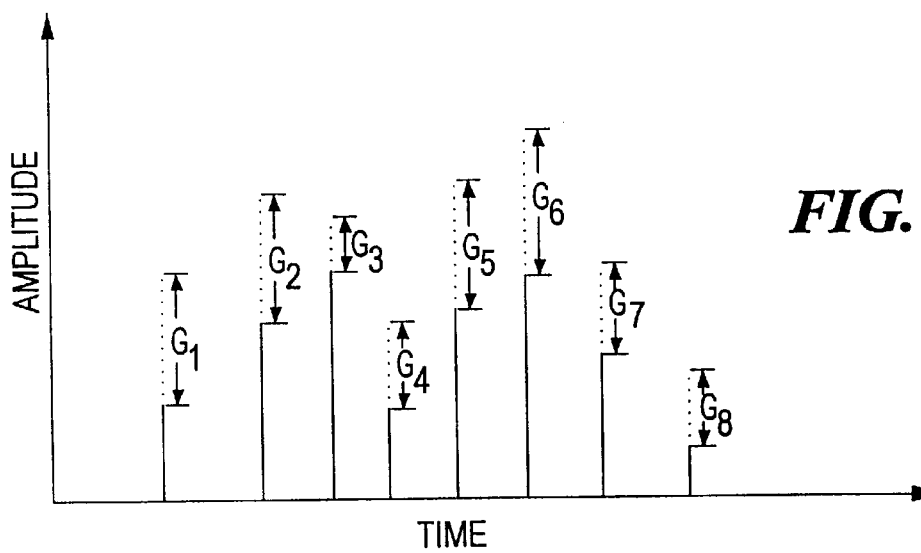
Figure 6C:
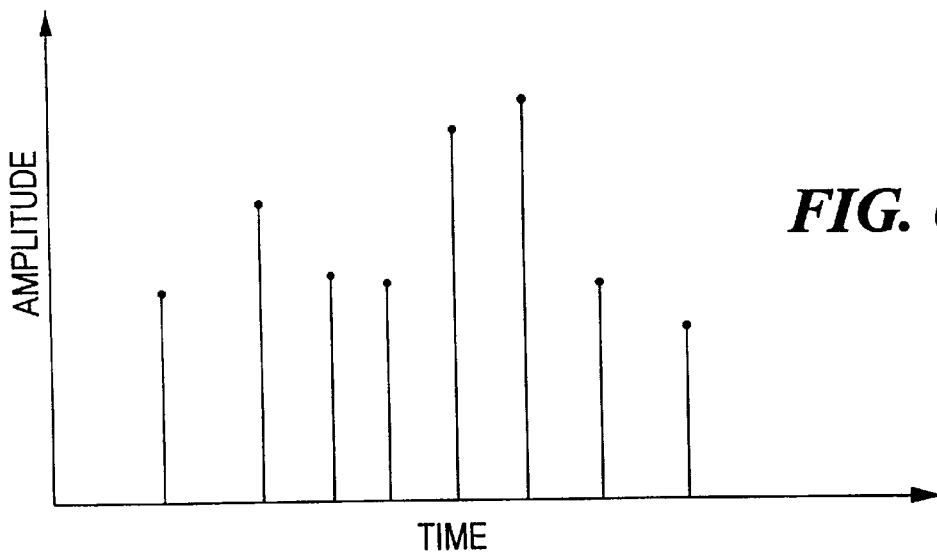

Referring to FIGS. 6A, 6B, and 6C, illustrated are graphs showing the process of correcting tone-signals representing voice-related data in accordance with the first embodiment of the invention for normalizing the channel, described above. The graph of FIG. 6A represents the tone signals transmitted from the AUD 2 to the UVS 12 representative of stored voice-related data. The frequency and amplitude of the signals in the graph of FIG. 6A are known to the UVS 12. Note that the tone signals represent a portion of the frequency spectrum in which the user's voice typically appears. The graph of FIG. 6B represents the distortion affecting the tone signals in the graph of FIG. 6A, and shows the distortion of the tone signals upon receipt at the receiver located at the UVS 12. Also shown in this graph are the level or amplification gain factors, G1–G8, that are applied to the tone signals of graph of FIG. 6B by the UVS to compensate for the distortions in the amplitude levels. In the graph of FIG. 6C, the amplification gain factors amplify the tone signals in the of graph of FIG. 6B so that they reach the amplification levels of the tone signals shown in the graph of FIG. 6A. The amplification gain factors are stored in the memory module 816 of the UVS 12 for later application in the correction device, thereby compensating for any signal distortions in a later-received live voice sample.

Notwithstanding the above process of correcting tone signals as described above, referring to FIG. 2A, the AUD 2 may also re-test the generation of tones to insure that the tones have a correct tone signal level. If the desired output level was not achieved, the microprocessor 104 repeats the calibration sequence. In one embodiment, when it is detected that a tone signal level fails to achieve the predetermined level, e.g., desired signal level after one or more attempts to adjust the output level, the AUD 2 indicates a "don't use" condition on a display device 202.

Figure 7A:
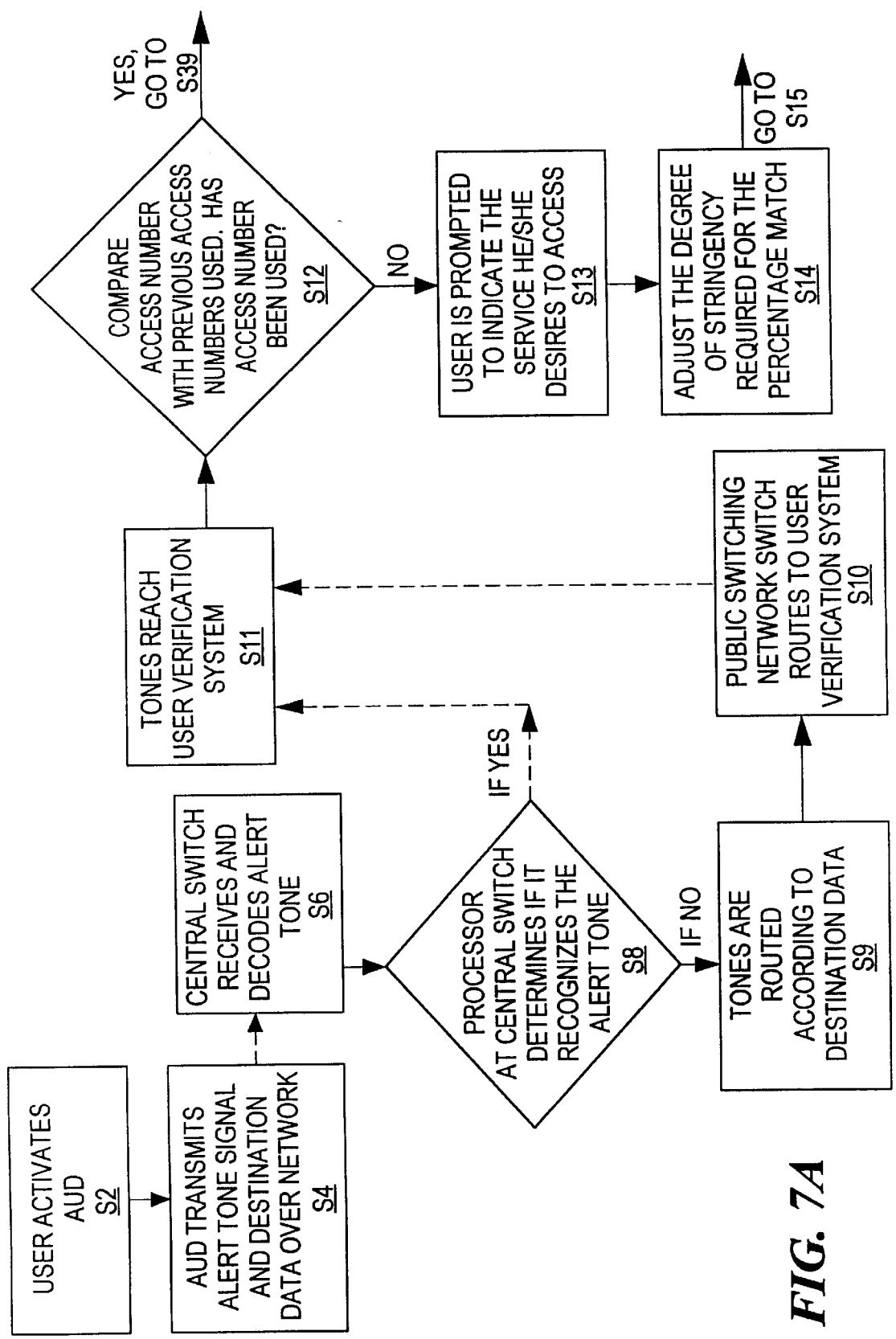
FIG. 7A is a flow chart describing the process by which tones reach a user-verification system.

Referring to the flow chart of FIG. 7A, the process by which tones reach a UVS 12 is shown. As shown in step S2, operation is typically initiated when the caller activates the AUD 2 to transmit a signal into the telephone handset 121, via a modem associated with a computer 6, or via a pbx switch 4. Alternatively, the user may call a number associated with a service, and then activate the AUD 2. Upon activation, in step S4, the AUD 2 transmits an access number in the form of tone signals over the network to a central switch 8. The tone signals typically include an alert tone signal and a destination data signal using standard DTMF. The tones are received at the central switch 8, shown in step S6, and the tone demodulator 515 demodulates the tone signals. In step S8, a processor 518 associated with the central switch 8, determines if the alert tone is recognizable. If the alert tone is recognizable by the processor 518, the tone signals are directly routed to the intended UVS 12 as shown in step S11. If the alert tone is not recognizable at the processor 518, as shown in S9, the central switch 8 routes the tone signals to a public switching network switch in step S10. In this step, the switch recognizes the destination data and routes the tone signals to the UVS 12 over local and/or long distance carriers. The tone signals eventually reach the UVS 12 as shown in step S11, where preliminary screening for fraudulent users is initiated in step S12. In this step, the UVS 12 examines the access number used by the AUD 2 to reach the UVS 12 and determines whether this access number has already been used within a predetermined time period set by the UVS 12, typically one day.

As stated above, an algorithm is used in the AUD 2 to increment an original, or seed access number so that the AUD 2 dials a different access number with each successive use. In the event that a fraudulent user has tape recorded the tone signals comprising user's access number, which can occur for example, if the user used his AUD 2 with a cellular telephone, the fraudulent user will have picked up the AUD's last used access number. The comparison in step S12 allows the UVS 12 to detect this. In the event that the access number has been used within the predetermined time period, control goes to step S39 shown in FIGS. 7B-1 and 7B-2. If the comparison indicates that the access number used by the AUD 2 has not been used within the predetermined time period, in this embodiment of the invention, control goes to step S13. In this step, the user is prompted to indicate the service he/she desires to access. For example, the user may indicate via the digits on the telephone keypad or by voice, that he/she wishes to access a service, such as a bank, the internet, or database. The UVS 12, depending on the service required, will adjust the degree of stringency required, as shown in step S14. This is further described as the percentage match, in steps S33, and S35 shown in FIG. 7B-2. After performing an adjustment, control is routed to step S15 in FIG. 7B-1.

Figures 1, 7B:
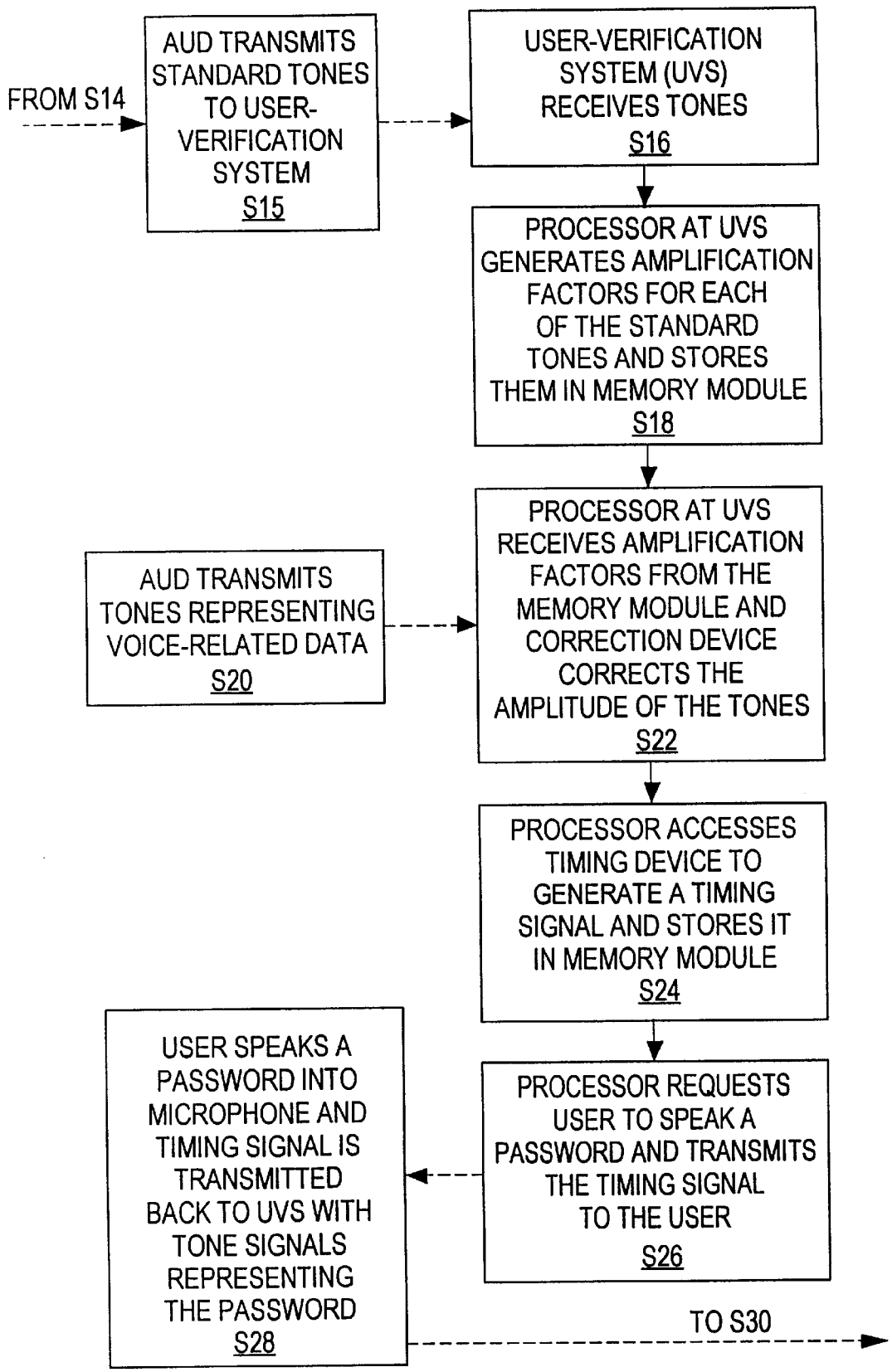
Figures 2, 7B:
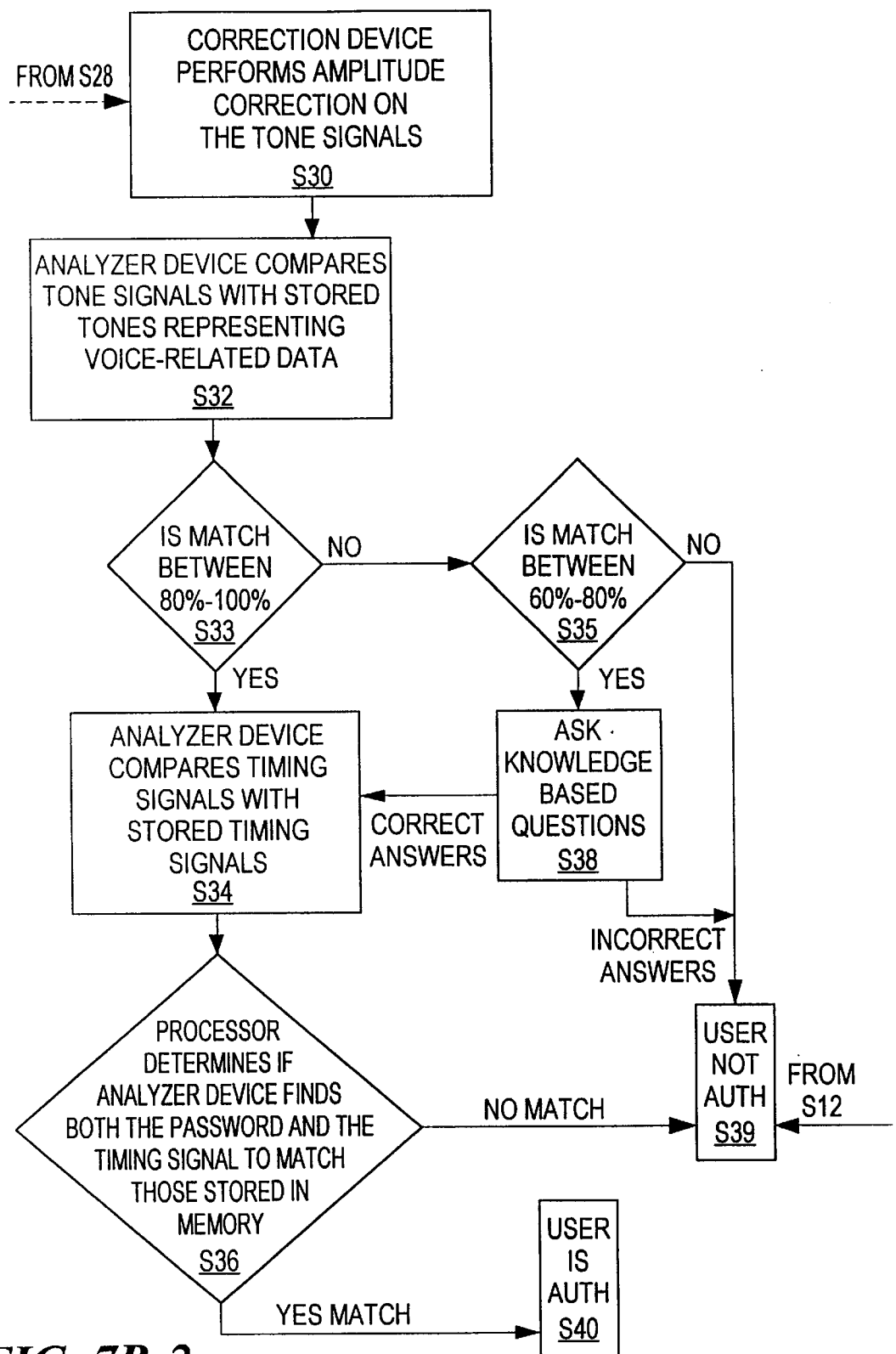

Referring to the flow chart of FIGS. 7B-1 and 7B-2, the user-authentication system verifies the validity of the user by performing the following steps. In step S15, the AUD 2, in one embodiment of the invention transmits standard tones that are representative of the portion of the frequency spectrum in which an authorized user's voice typically lies, to normalize the channel. As stated above, in other embodiments, the tone signals comprising the access number or the tone signals transmitted during the inter-digit periods between dtmf signals can be used to normalize the channel. In step S16, the UVS 12 receives the tones and in step S18, a processor 802 at the UVS 12 generates amplification factors for each of the standard tones and stores them in the memory module. In step S20, the AUD 2 transmits tone representing voice-related data, previously described in FIG. 4B as the speech verification file. In step S22, the processor 802 at the UVS 12 retrieves the amplification factors stored in a memory module 816 and the correction device corrects the amplitude of the received tones. In step S24, the processor 802 accesses the timing device 814 which generates a timing signal which is stored in the memory module 816. In step S26, the processor 802 via the transmitter 806 then transmits a request to the user, requesting the user to speak a password or passphrase into the telephone handset. As also shown in this step, the transmitter 806 transmits the timing signal, however this transmission occurs after the request signal has been transmitted, so that receipt of the timing signal by the user approximately coincides with the time that the user will speak the password or passphrase. If the user is accessing the UVS 12 through a telephone, the request signal is transmitted as an operator's voice through the handset 121. If the user is accessing the UVS through his/her computer 6, the computer monitor will provide a visual request directing the user to state a password or passphrase into the microphone attached to the computer 6. Alternatively, if the user has a multi-media computer system with audio capability, an audible request can also be generated as an operator's voice. As an added measure of security the request signal can ask the user for non-voice information, for example, the request can ask the user to enter his/her personal identification number ("pin") by pushing the buttons on a touch-tone phone, or by entering the numbers from a keyboard.

As shown in step S28, the user speaks a password or passphrase into the microphone causing signals related to the user's voice to be transmitted to the UVS 12. In addition to the tone signals, the timing signal is transmitted back to the UVS 12. In step S30, the correction device 808 at the UVS 12 performs amplitude correction on the tone signals representing the live voice-related data. As shown in step S32, the processor 802 after receipt of the corrected tone signals, transmits the corrected tone signals to the analyzer device 810 where voice verification takes place. To perform voice-verification, the processor 802 communicates with the memory module 816, and directs the memory module 816 to transmit the stored voice-related data (via the processor) to the analyzer device 810 which compares the voice-related data with tones related to the live voice sample representing the user's password or passphrase, referred to as speaker-dependent recognition. The analyzer device 810 then determines if the stated password or passphrase is the same as the password or passphrase stored in the memory module 816. The analyzer device 810 also determines if the voice frequencies representing the user-stated password or passphrase are the same as those stored in the memory module 816. The match is determined based on a range of 0%–100%. Typically, if the likelihood that the tone signals match the stored voice-related data is above 80%, the user is considered authorized. Of course, other factors such as the degree of noise in the channel, often a problem when the user is calling from a cellular phone, can result in the stringency of the match being reduced to a lower percentage, for example 60%. On the other hand, the security requirements imposed by the service can require the stringency of the match to be adjusted such that it is closer to 100%, for example, when a user is calling a bank to accomplish a wire transfer. Additionally, stringency requirements may be heightened in the event that the user has been impersonated before by a fraudulent user. Still other factors may warrant reducing or increasing the percentage of the match.

Should the analyzer device 810 determine in step S35 that the match lies in an uncertainty range, which in one embodiment, is typically between 60%–80%, the analyzer device 810 will ask the user knowledge based questions, referred to as speaker-dependent recognition, as further described in step S38. If the user correctly answers many of the knowledge based questions asked in step S38, control goes to step 34. If the user answers many questions incorrectly, control goes to step 39, indicating that the user is not authorized. If in step 35, the analyzer determines that the match percentage is below 60%, the user is considered unauthorized, as set forth in step S39.

As indicated in step S34, to perform time-verification, the processor 802 communicates with the memory module 816, and directs the memory module 816 to transmit the stored timing signal (via the processor) to the analyzer device 810 which compares the stored timing signal with the timing signal received with the user's password or passphrase, to determine if the two signals match. Note that this match should be close to 100%. Determinations from step S33 or S38, along with the determination from step S34, are sent by the analyzer device 810 to the processor 802, where in step S36, the processor 802 determines whether the analyzer device 810 found both the tone signals related to the live voice sample and the timing signal as matching those stored in the memory module 816. Upon making a determination affirmatively, the processor 802 indicates to that the user is authorized, as set forth in step S40. If one of the signals did not match that stored in the memory module 816, the processor indicates that the user is not authorized, as set forth in step S39.

In the event that the user is not authorized due to the likelihood of a match falling in the 60%–80% range as shown in step S32, the UVS provides further authentication measures, and the analyzer device 810 asks knowledge-based questions as shown in step S38. However, in an alternate embodiment, depending on the stringency of the match required by the service, the UVS 12 may not institute such questions for those users whose voice falls within that range, instead designating them unauthorized users. In yet another alternate embodiment, the analyzer device 810 will initiate knowledge-based questioning notwithstanding a near 100% voice match. Such an embodiment is typically used when the stringency requirements of the service require a higher level of scrutiny before granting user access.

In one embodiment, knowledge-based questions are stored at the UVS 12, and the UVS 12 selects, in step S38, a number of questions for the user to answer, the number being greater when the user's voice is closer to the 60% mark. The questions will range from user's pin, home zip code, first four digits of phone number, last four digits of phone number, social security number, date of birth, mother's maiden name, children's names, children's dates of birth, etcetera. Preferably, the knowledge-based questions are randomly selected or selected from a circular list, such that the same question is not repeated within a predetermined number of questions. However, if a user has offered an incorrect answer to a knowledge-based question, the UVS 12 marks that question for subsequent repetition, following at least one intervening question, in an effort to catch a fraudulent user. If the user fails to answer all of the questions correctly, the user is denied access to the service as being an unauthorized user. Note that the user will typically not be asked his address to protect his privacy, however, the UVS 12 will be able to ask such a question with permission from the user, such as when the user says the word "address".

Figure 8:
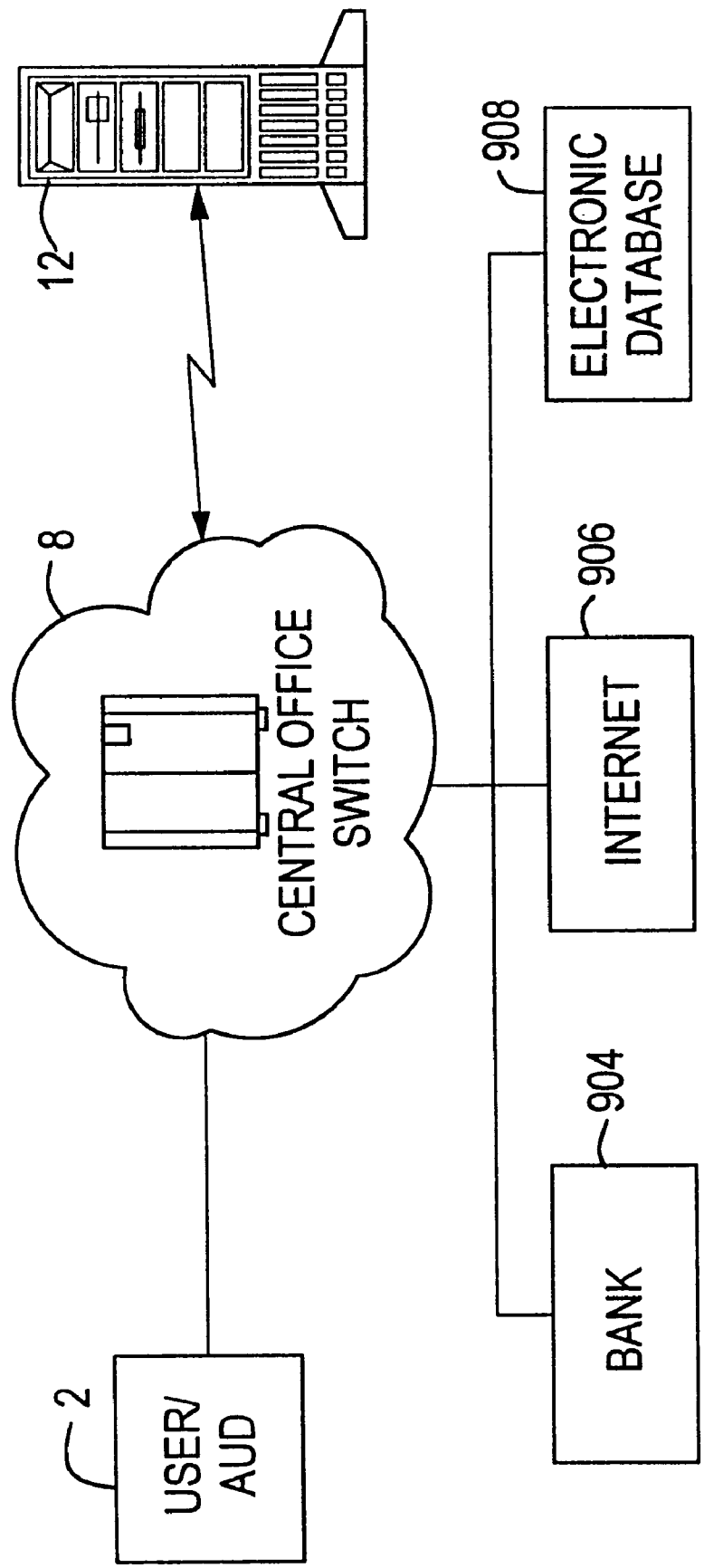
FIG. 8 is a block diagram showing a service accessible to an authorized user through the user-authentication system.

Referring to FIG. 8, illustrated are the services accessible to a user through the user-authentication system of the present invention. Once the UVS 12 determines that a user is authorized, the processor associated with the UVS 12 provides a signal to the user telling the user that he/she is authorized to access a service available through the user-authentication system and communicates with the central switch 8. The central switch 8 signals the desired service and connects the user to the desired service shown as a bank 904, the internet 906, and an electronic database 908. In one embodiment, the UVS 12 thereafter remains dormant, and the user communicates with the service 904, 906, 908 through a communication route established by the central switch 8.

The foregoing description has been limited to a specific embodiment of this invention. It will be apparent however, that variations and modifications may be made to the invention, with the attainment of some or all of the advantages of the invention. Therefore, it is the object of the appended claims to cover all such variations and modifications as come within the true spirit and scope of the present invention.

The invention that is claimed is:

1. A device for generating a series of tone signal pairs, each tone signal pair including simultaneously asserted first and second tones, said device comprising:

a first tone generator device generating a plurality of first frequency tones;

a second tone generator device generating a plurality of second frequency tones;

a first amplifier electrically coupled to said first tone generator device, said first amplifier amplifying a first frequency tone to a first signal level and a first frequency tone to a second signal level;

a second amplifier electrically coupled to said second tone generator device, said second amplifier amplifying a second frequency tone to a third signal level and a second frequency tone to a fourth signal level; and a control device in electrical communication with said first and second tone generator devices and in electrical communication with said first and second amplifiers, said control device controlling said first and second tone generator devices and said first and second amplifiers to generate a tone group comprising at least two tone pairs:

a first tone pair of said at least two tone pairs comprising said first frequency tone amplified to said first signal level and said second frequency tone amplified to said third signal level; and a second tone pair of said at least two tone pairs comprising said first frequency tone amplified to said second signal level and said second frequency tone amplified to said fourth signal level, said first signal level differing from said third signal level and said second signal level differing from said fourth signal level, wherein said first tone pair is related to the transmission characteristics of a first type of microphone, and said second tone pair is related to the transmission characteristics of a second type of microphone.

2. The device of claim 1, wherein said first type of microphone is a carbon microphone and said second type of microphone is an electret microphone.

3. A method of generating a dual tone multi-frequency ("DTMF") signal, comprising the steps of:

generating a plurality of first frequency tones;

amplifying said first frequency tones to generate a first frequency tone signal having a first signal level, and a first frequency tone signal having a second signal level;

generating a plurality of second frequency tones;

amplifying said second frequency tones to generate a second frequency tone signal having a third signal level and a second frequency tone signal having a fourth signal level;

combining said first frequency tone signal having said first signal level with said second frequency tone signal having said third signal level to form a first tone pair, wherein said first signal level differs from said third signal level;

combining said first frequency tone signal having said second signal level with said second frequency tone signal having said fourth signal level to form a second tone pair, wherein said second signal level differs from said fourth signal level;

relating said first and third signal levels to transmission characteristics of a carbon microphone;

relating said second and fourth signal levels to transmission characteristics of an electret microphone; and outputting a tone group comprising said first and second tone pairs.

4. A system for using a series of tone signal pairs to compensate for impairments associated with a telephone microphone, comprising:

a tone generator adapted to interface with a telephone handset, for generating and transmitting to the handset, a first tone pair and a second tone pair, said first tone pair comprising a low frequency tone having a first amplification level and a high frequency tone having a second amplification level; and said second tone pair comprising a low frequency tone having a third amplification level and a high frequency tone having a fourth amplification level; wherein said first and second amplification levels compensate for impairments associated with a carbon microphone, and said third and fourth amplification levels compensate for impairments associated with an electret microphone; and a compensating module disposed on a network in communication with said tone generator for receiving said first and second tone pairs, and compensating for impairments associated with a microphone disposed within the telephone handset.

5. The system of claim 4, further comprising:

a first memory module in communication with said tone generator and said compensating module, for storing said first, second, third and fourth amplification levels.

6. The system of claim 5, further comprising:

a module for retrieving said first, second, third and fourth amplification levels from said first memory module, and transmitting said first, second, third and fourth amplification levels to said tone generator.

7. The system of claim 4, further comprising:

an authentication device coupled with said tone generator for storing data relating to a user assigned to said authentication device.

8. The system of claim 7, wherein said data includes the user's telephone number.

9. The system of claim 4, said compensating module receiving data relating to a user of the telephone, said data including the user's telephone number.

10. A system for using a series of tone pairs to compensate for impairments associated with a telephone or computer console microphone, comprising:

a tone generator for generating a plurality of tone pairs, each of said tone pairs comprising a high frequency tone and a low frequency tone, each amplified to differing amplification levels; and storage for storing said amplification levels and data, said data including telephone numbers, wherein said differing amplification levels compensate for impairments in a microphone.

11. The system of claim 10, wherein said amplification levels compensate for impairments in a carbon microphone.

12. The system of claim 10, wherein said amplification levels compensate for impairments in an electret microphone.

13. The system of claim 10, wherein said plurality of tone pairs comprises a first tone pair and a second tone pair.

14. The system of claim 13, wherein said first tone pair comprises a low frequency tone having a first amplification level and a high frequency tone having a second amplification level; and said second tone pair comprises a low frequency tone having a third amplification level and a high frequency tone having a fourth amplification level.

* * * * *